US012572781B2

(12) United States Patent
Alvord et al.

(10) Patent No.: US 12,572,781 B2
(45) Date of Patent: Mar. 10, 2026

(54) VIRTUAL-SENSING INTEGRATED FOR PREDICTIVE RELIABILITY

(71) Applicant: Georgia Tech Research Corporation, Atlanta, GA (US)

(72) Inventors: David Alvord, Smyrna, GA (US); David I. Pendleton, Atlanta, GA (US); Aimee N. Williams, Roswell, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 477 days.

(21) Appl. No.: 18/022,468

(22) PCT Filed: Aug. 23, 2021

(86) PCT No.: PCT/US2021/047072
§ 371 (c)(1),
(2) Date: Feb. 21, 2023

(87) PCT Pub. No.: WO2022/040617
PCT Pub. Date: Feb. 24, 2022

(65) Prior Publication Data
US 2023/0359863 A1      Nov. 9, 2023

Related U.S. Application Data

(60) Provisional application No. 63/068,461, filed on Aug. 21, 2020.

(51) Int. Cl.
*G06N 3/045* (2023.01)
*F02K 9/96* (2006.01)
(Continued)

(52) U.S. Cl.
CPC ............... *G06N 3/045* (2023.01); *F02K 9/96* (2013.01); *G01M 15/14* (2013.01); *G06N 3/0985* (2023.01); *F05D 2260/83* (2013.01)

(58) Field of Classification Search
CPC ........ G06N 3/045; G06N 3/0985; F02K 9/96; G01M 15/14; F05D 2260/83;
(Continued)

(56) References Cited

U.S. PATENT DOCUMENTS 5,942,682 A      8/1999   Ghetzler et al.
6,253,166 B1    6/2001   Whitmore et al.
(Continued)

OTHER PUBLICATIONS

International Search Report and Written Opinion received in PCT/US2021/047072 mailed Nov. 9, 2021, 12 pages.
(Continued)

*Primary Examiner* — Manuel A Rivera Vargas
(74) *Attorney, Agent, or Firm* — Meunier Carlin & Curfman LLC

(57) ABSTRACT

An exemplary virtual sensing method and system are disclosed for predictive reliability (VIPR) procedure and/or controls that employ artificial intelligence and machine learning (AI/ML), particularly deep neural networks and multi-modal deep learning, with vehicle sensor data to create virtual sensors. The virtual sensors can be used to estimate measurements and operating conditions in a hostile environment in rockets and vehicle systems.

18 Claims, 16 Drawing Sheets

(51) Int. Cl.
  *G01M 15/14*     (2006.01)
  *G06N 3/0985*    (2023.01)
(58) Field of Classification Search
  CPC ............. F05D 2220/80; F05D 2230/72; F05D
           2260/821; G06Q 10/20; F01D 21/003
  See application file for complete search history.

(56)           References Cited

U.S. PATENT DOCUMENTS

| | | | |
|---|---|---|---|
| 9,963,251 B2 * | 5/2018 | Dimpfl ..................... B64G 1/66 |
| 2003/0177824 A1 | 9/2003 | Parfitt et al. |
| 2003/0204327 A1 | 10/2003 | Stedman et al. |
| 2015/0285139 A1 | 10/2015 | Edwards et al. |
| 2016/0347482 A1 * | 12/2016 | Dimpfl ..................... B64G 3/00 |
| 2017/0356303 A1 | 12/2017 | Hodge |
| 2018/0354630 A1 * | 12/2018 | Nakhjavani ............ G06N 3/084 |
| 2018/0354646 A1 * | 12/2018 | Nakhjavani ........... G01M 15/14 |
| 2019/0087682 A1 * | 3/2019 | Guan ................... G06V 10/771 |
| 2021/0398289 A1 * | 12/2021 | Schmidt ................. G06N 3/045 |

OTHER PUBLICATIONS

D. Noble, L. Angello, S. Shepard, J. Kee, B. Emerson, T. Lieuwen, "Investigation into Advanced Combustion System Health Monitoring", ASME Turbo Expo, Jun. 2019.
A. Petrarolo, M. Kobald, A. Rüttger, "Data Clustering of Hybrid Rocket Combustion Flame", AIAA Propulsion and Energy, Aug. 2019.
A. Mahajan, S. Chitikeshi, L. Utterbach, P. Bandhil, and F. Figueroa, "Application of intelligent sensors in the integrated systems health monitoring of a rocket test stand", Defense and Security Symposium, May 2006.
Seongwoon Jeong, Max Ferguson, and Kincho Law. Sensor data reconstruction and anomaly detection using bidirectional recurrent neural network. p. 25, 03 2019.
Angelos Katharopoulos and Francois Fleuret. Not all samples are created equal: Deep learning with importance sampling. CoRR,abs/1803.00942, 2018.
Bob Kurbel. Peak of Flight Newsletter, vol. 441. Apr. 2017.
Bryan S. Morse. Lecture 4: Thresholding, Jan. 2000.
Kushagra Rastogi and Navreet Saini. Virtual sensor modelling using neural networks with coefficient based adaptive weights and biases search algorithm for diesel engines. CoRR, abs/1712.08319, 2017.
Jeff Scott. Aerospaceweb.org. Apr. 2005.
Shan-Bin Sun, Yuan-Yuan He, Si-Da Zhou, and Zhen-Jiang Yue. Adata-driven response virtual sensor technique with partial vibration measurements using convolutional neural network. Sensors, 17:2888,12 2017.
Zhou Wang, Alan C. Bovik, Hamid R. Sheikh, and Eero P. Simoncelli. Image quality assessment: From error visibility to structural similarity. IEEE Transactions on Image Processing, 13(4):600-612, 2004.
Jinsung Yoon, William R. Zame, and Mihaela van der Schaar. Deep sensing: Active sensing using multi directional recurrent neural networks. In International Conference on Learning Representations,2018.

* cited by examiner images reconstructions

900

Generate an initial set of
superpixel groups
902

Consolidate the initial set of superpixel
groups and remove dark superpixels
904

Generate a revised set of superpixel
groups
906

Determine the mean or central pixel
location of the superpixel groups
908

Select the group as having the
presence of shock to localize the
determination of shock in
a given plume    910

VIRTUAL-SENSING INTEGRATED FOR PREDICTIVE RELIABILITY

RELATED APPLICATION

This application is a U.S. National Stage application filed under 35 U.S.C. § 371 of PCT/US2021/047072, filed Aug. 23, 2021, which claims priority to, and the benefit of, U.S. Provisional Application No. 63/068,461, filed Aug. 21, 2020, entitled "Virtual Sensing Integrated for Predictive Reliability (VIPR)", each of which is hereby incorporated by reference herein in its entirety.

BACKGROUND

Predictive maintenance can reduce downtime and avoid failures in many types of machinery and jet applications, such as for aerospace vehicles. Unfortunately, most sensors used for these tasks rely on real-time data to determine failures or remaining flight time, often at the onset of failures, which is thus a reactionary approach to maintenance that can is limited by data. In addition, sensor data can be poor in quality, e.g., having dropouts or faulty readings. The delay in the detection of onset failures and the poor quality of the sensors can lead to conservative maintenance practices that do not adequately capture the times when maintenance needs to be performed.

An example predictive maintenance is in the monitoring of the health and performance of gas turbine combustion dynamics [1]. Data clustering analysis of hybrid rocket flame has been reported for use in the identification of various phases of combustion using high-speed imaging sensors placed at an optically accessible combustion chamber [2]. Intelligent sensors have been reported for use in an integrated network of physical sensors and virtual sensors of the same that can monitor the health of a rocket test stand [3].

There are nevertheless benefits to the improve sensing for predictive reliability and for controls.

SUMMARY

An exemplary virtual sensing method and system are disclosed for predictive reliability (VIPR) procedure and/or controls that employ artificial intelligence and machine learning (AI/ML), particularly deep neural networks and multi-modal deep learning, with vehicle sensor data to create virtual sensors—thus, virtual data. Notably, the virtual sensors can be used to estimate measurements and operating conditions in a hostile environment in rockets and vehicle systems where physical sensors are prohibitively expensive to implement or cannot be implemented within degrading the overall performance of that engine or machinery.

In an aspect, a virtual sensing deep neural network is disclosed comprising a deep neural network trained with a plurality of sensor data and plume image data measured from a plurality of sensors and a camera sensor of a test cell housing an engine, wherein the deep neural network is configured to generate virtual plume image data from a second plurality of sensor data of a jet engine or rocket motor, wherein the virtual plume image data is analyzed to determine a presence and localization of shock wave data in the virtual plume image data, and wherein the presence and localization of shock wave data in the virtual plume image data are used to determine a virtual sensed Mach number or an internal pressure of the jet engine or rocket motor (e.g., for predictive maintenance analysis or for anomaly detection).

In some embodiments, the virtual sensing deep neural network further includes instructions that, when executed by a processor, causes the processor to determine the presence and localization of shock wave data in the virtual plume image data by generating a set of superpixel groups in the virtual plume image data, wherein each of the set of superpixel groups comprises (i) a plurality of pixels and (ii) a mean or central pixel location of the plurality of pixels; and selecting, via a clustering analysis or relative peak analysis, of the virtual plume image data, one or more set of superpixel groups.

In some embodiments, the second plurality of sensor data comprises surface temperature data of the jet engine or rocket motor; thrust data of the jet engine or rocket motor; and/or acceleration data of the jet engine or rocket motor.

In some embodiments, the second plurality of sensor data further comprises acoustic data of the jet engine or rocket motor; pressure data of the jet engine or rocket motor; and/or flow rate data of fuel of the jet engine or rocket motor.

In some embodiments, the deep neural network comprises an autoencoder, a RNN, an LSTM-based deep neural network, a CNN-based deep neural network, or a combination thereof.

In some embodiments, the deep neural network is configured to output, via a report, the determined virtual sensed Mach number or internal pressure of the jet engine or rocket motor.

In some embodiments, the output of the determined virtual sensed Mach number or internal pressure of the jet engine or rocket motor is used, via predictive maintenance analysis, to estimate a remaining life parameter of the jet engine or rocket motor or an estimated failure of the jet engine or rocket motor.

In some embodiments, the deep neural network is configured to output the determined virtual sensed Mach number or internal pressure of the jet engine or rocket motor for anomaly detection.

In some embodiments, the virtual sensing deep neural network further includes a second deep neural network trained with the plurality of sensor data and plume image data measured from the plurality of sensors and the camera sensor of the test cell housing the engine, wherein the second deep neural network is configured to generate a virtual sensed temperature data from the second plurality of sensor data of the jet engine or rocket motor.

In some embodiments, the virtual sensing deep neural network further includes a second deep neural network trained with the plurality of sensor data and plume image data measured from the plurality of sensors and the camera sensor of the test cell housing the engine, wherein the second deep neural network is configured to generate a virtual sensed pressure data from the second plurality of sensor data of the jet engine or rocket motor.

In some embodiments, the virtual sensing deep neural network further includes a second deep neural network trained with the plurality of sensor data and plume image data measured from the plurality of sensors and the camera sensor of the test cell housing the engine, wherein the second deep neural network is configured to generate a virtual sensed thrust data from the second plurality of sensor data of the jet engine or rocket motor.

In some embodiments, the virtual sensing deep neural network further includes a second deep neural network trained with the plurality of sensor data and plume image data measured from the plurality of sensors and the camera sensor of the test cell housing the engine, wherein the second deep neural network is configured to generate a virtual sensed acceleration data from the second plurality of sensor data of the jet engine or rocket motor.

In some embodiments, the second plurality of sensor data comprises surface temperature data of the jet engine or rocket motor, thrust data of the jet engine or rocket motor, acceleration data of the jet engine or rocket motor, acoustic data of the jet engine or rocket motor, pressure data of the jet engine or rocket motor, and/or flow rate data of fuel of the jet engine or rocket motor.

In another aspect, a virtual sensing deep neural network is disclosed comprising a deep neural network trained with a plurality of sensor data measured from a plurality of sensors of a test cell housing an engine, wherein the deep neural network is configured to generate a temperature, pressure, thrust, or acceleration sensor data from a second plurality of sensor data of a jet engine or rocket motor, (e.g., wherein the temperature, pressure, thrust, or acceleration sensor data is used or predictive maintenance analysis or for anomaly detection).

In some embodiments, the second plurality of sensor data comprises surface temperature data of the jet engine or rocket motor.

In some embodiments, the second plurality of sensor data further comprises thrust data of the jet engine or rocket motor.

In some embodiments, the second plurality of sensor data further comprises acceleration data of the jet engine or rocket motor.

In some embodiments, the second plurality of sensor data further comprises acoustic data of the jet engine or rocket motor.

In some embodiments, the second plurality of sensor data further comprises pressure data of the jet engine or rocket motor.

In some embodiments, the second plurality of sensor data further comprises flow rate data of fuel of the jet engine or rocket motor.

In some embodiments, the deep neural network comprises an autoencoder, an RNN, an LSTM-based deep neural network, a CNN-based deep neural network, or a combination thereof.

In some embodiments, the virtual sensing deep neural network further includes a second deep neural network generated from the virtual sensing deep neural network of any one of the above claims.

In another aspect, a method is disclosed of training a virtual sensing deep neural network of any one of the above claims.

In another aspect, a method is disclosed of using a virtual sensing deep neural network of any one of the above claims.

In another aspect, a non-transitory computer-readable medium is disclosed having instructions stored thereon, wherein execution of the instructions by a processor causes the processor to execute a virtual sensing deep neural network of any one of the above claims.

BRIEF DESCRIPTION OF THE DRAWINGS

The accompanying drawings, which are incorporated in and constitute a part of this specification, illustrate embodiments and, together with the description, serve to explain the principles of the methods and systems.

DETAILED SPECIFICATION

An exemplary virtual sensing method and system are disclosed for predictive reliability (VIPR) procedure that employs artificial intelligence and machine learning (AI/ML), particularly deep neural networks, with vehicle sensor data to create virtual sensors.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the $1^{st}$ reference in the list. All references cited and discussed in this specification are incorporated herein by reference in their entireties and to the same extent as if each reference was individually incorporated by reference.

Example System

Figure 1:
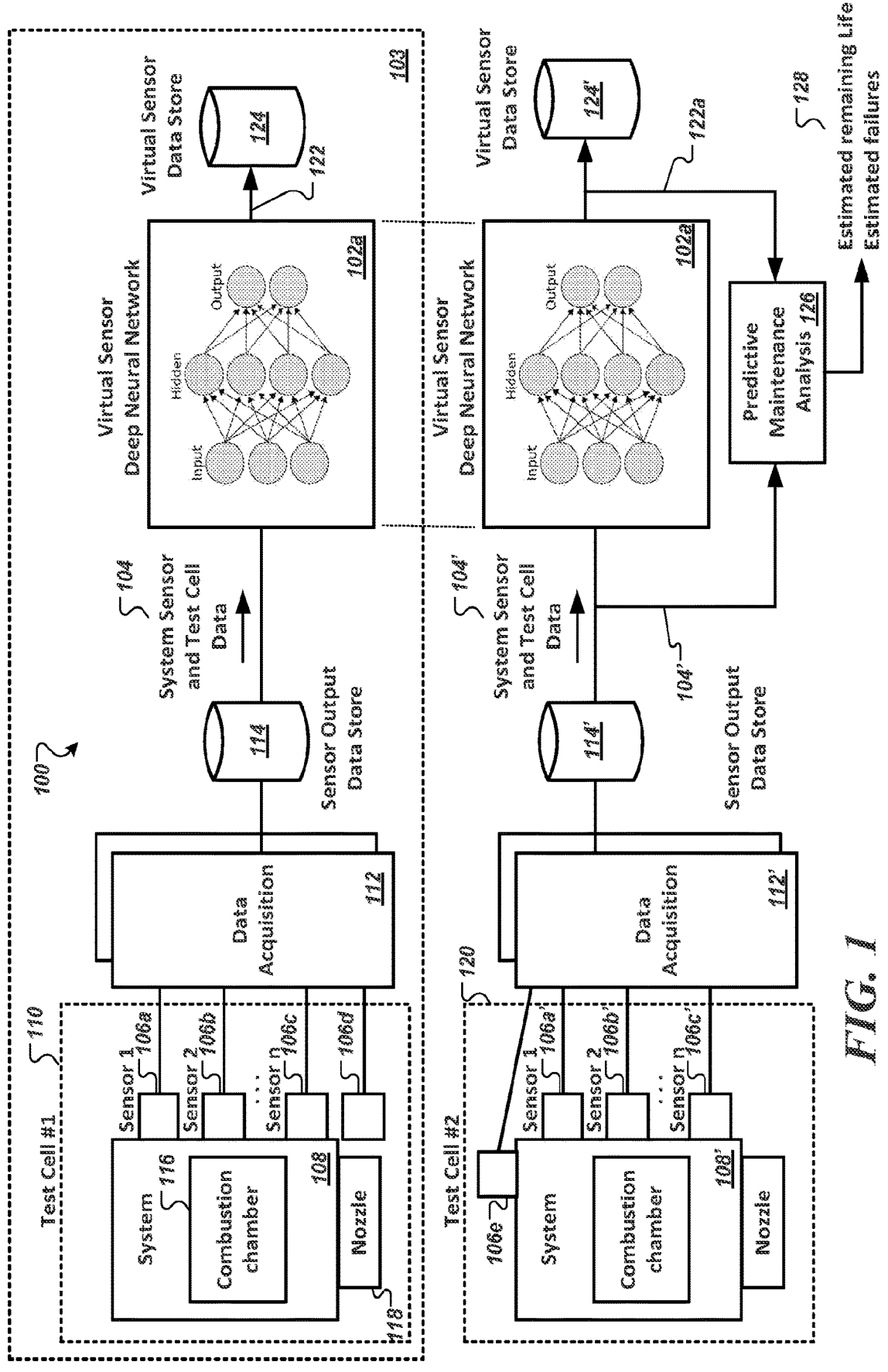
FIG. 1 shows an example virtual sensing deep neural network configured for predictive maintenance in accordance with an illustrative embodiment.

FIG. 1 shows an example virtual sensing deep neural network 102 (shown as 102a) configured for predictive maintenance in accordance with an illustrative embodiment. In the example of FIG. 1, system 100 includes a development environment 103 to configure and train the virtual sensing deep neural network 102a. The virtual sensing deep neural network 102a is configured using training data 104 (shown as "System Sensor and Test Cell Data" 104) acquired from sensors 106 (shown as "Sensor 1" 106a, "Sensor 2" 106b, "Sensor n" 106c) that instruments a test system 108 of a test cell 110 to generate virtual sensor output 122.

System 100 includes one or more data acquisition systems 112 that provide the training data 104 to a data store 114. The test system 108, in this example provided in the context of a rocket motor, is shown in this example to include a combustion chamber 116 and nozzle 118 that are monitored by the sensors 106a, 106b, and 106c and a high-speed camera (shown as 106d) of the test cell 110 to provide the training data 104 (e.g., time-series sensor signals and high-speed acquired images or video) to the virtual sensing deep neural network 102a (e.g., executing on a server, cloud, or computing device) for its training. Indeed, test cells for other types of machinery and jet engines as described herein can be used.

Once trained and validated, the virtual sensing deep neural network 102a can be employed for the sensing of a virtual sensor (also referred to as sensor reconstruction) that can be used to evaluate conditions in the system 108, and like systems (shown as 108'), to predict its performance and maintenance.

In the example shown in FIG. 1, the virtual sensing deep neural network 102a can be employed for the sensing of a virtual sensor in an equivalent system being tested in another test cell 120 (shown as "Test Cell #2" 120). The second test cell 120 can include similar, and not identical, sensors or sensor configuration (shown as sensors 106a', 106b', and 106c') as those of test cell 110 as well as additional sensors (shown as 106e). For example, the first test cell 110 is shown to include a high-speed camera(s) that can be used to train a virtual sensor deep neural network that can output virtual sensed plume images. And the second test cell 120 is shown to be instrumented for a different test or configuration but can still benefit from having that high-speed camera sensor as a virtual sensor. In the example shown in FIG. 1, the sensors 106a', 106b', 106c', and 106e are provided through a data acquisition system 112' to the virtual sensing deep neural network 102a to generate virtual sensed plume images and to data store 114'. The virtual sensed plume images (shown as 122a) can be stored in data store 124' and provided along with some of the sensor data 104' (e.g., from sensors 106a', 106b', 106c', 116e) to a predictive mainte-nance analysis module 126 for predictive maintenance. Plume images can be analyzed, e.g., via analysis described later in, to determine the presence and localization of shock waves (also referred to as shocks), which can provide an indication of internal pressures and Mach performance of the system (108 and 108'). The internal pressures, Mach performance results and other sensors (e.g., thrust, pressure, acoustics, acceleration, fuel rate, among others) can be used to determine performance and anomalies in the system over time to assist in the estimation of life and failures. In the example shown in FIG. 1, the predictive maintenance analy-sis module 126 is configured to provide estimated remaining life values and estimated failures values 128.

Figure 2:
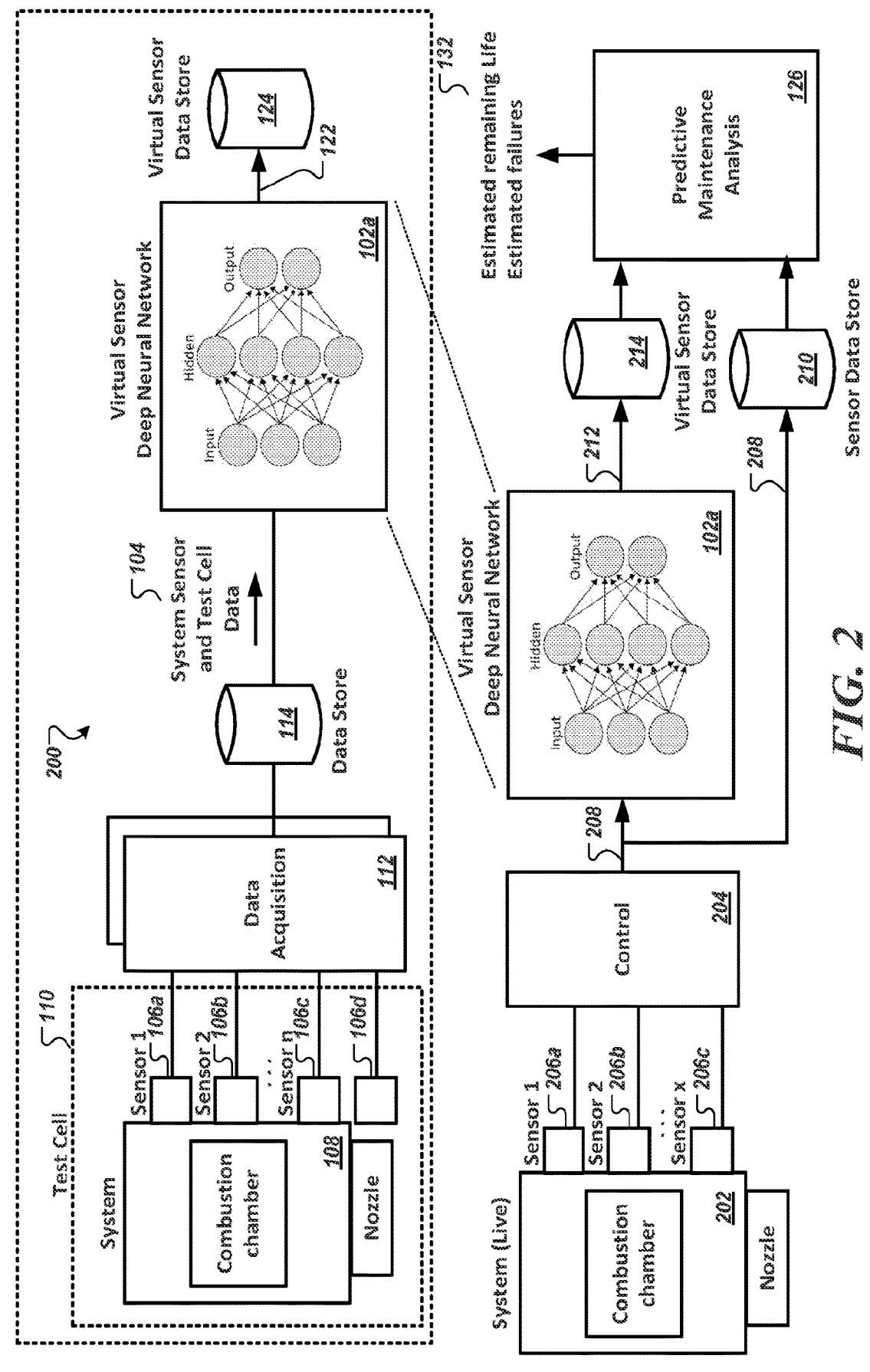
FIGS. 2 and 3 each shows example implementations of the virtual sensing deep neural network, e.g., for controls or for predictive maintenance, in accordance with an illustrative embodiment.
Figure 3:
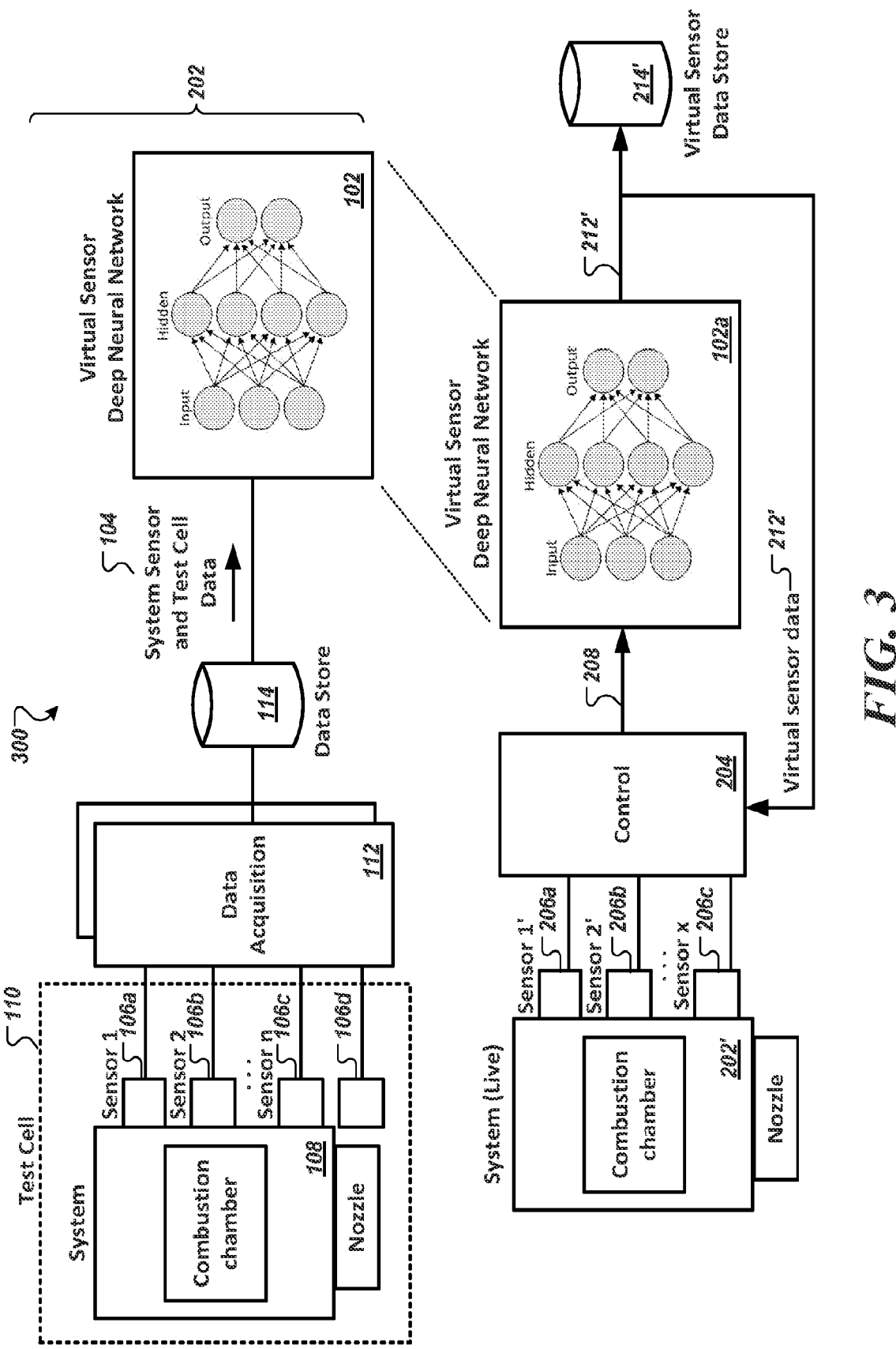

FIGS. 2 and 3 each shows an example implementation of the virtual sensing deep neural network 102a in a live system 202, e.g., for controls or for predictive maintenance. In the example shown in FIGS. 2 and 3, the same development system 103 is shown to configure and train a virtual sensing deep neural network 102a based on sensors 106a-106d.

In FIG. 2, the virtual sensing deep neural network 102a is configured to provide virtual sensor data for predictive maintenance. As shown, the virtual sensing deep neural network 102a receive similar sensor data 208 from control 204 that is connected to onboard sensor 206 (shown as "Sensor 1" 206a, "Sensor 2" 206b, and "Sensor x" 206c) and to use the onboard sensor data 208 to generate the virtual sensor data 212. Similar to FIG. 1, in this example, the virtual sensor data 212 (e.g., sensed plume images) can be stored in data store 214 and provided along with some of the sensor data 210 to a predictive maintenance analysis module 126 for predictive maintenance. In some embodiments, virtual sensing can be used to reduce the total weight of aircraft and potentially other vehicles by eliminating, or reducing, requirements of certain physical sensors that can be reconstructed from available sensors or smaller sensor types. In addition, virtual sensing can reduce the cost of maintenance and maintenance planning, e.g., for solid rocket motors and other vehicle propulsion systems in having real-time virtual sensor data for sections of interest of the motor or engine that were prohibitively difficult or expen-sive to acquire.

In FIG. 3, the virtual sensing deep neural network 102a is configured to provide virtual sensor data for controls and/or predictive maintenance. As shown, the virtual sensing deep neural network 102a receive similar sensor data 208 from control 204 that is connected to onboard sensor 206 (shown as "Sensor 1" 206a, "Sensor 2" 206b, and "Sensor x" 206c) and to use the onboard sensor data 208 to generate the virtual sensor data 212 (shown as 212'). The virtual sensor data 212' is provided as input to the control 204 to control the operation of system 202 (shown as 202'). In some embodi-ments, the virtual sensor data 212' include anomaly indica-tion of a sensor (e.g., pressure, temperature, flow). In addition, similar to FIGS. 1 and 2, the virtual sensor data 212' (e.g., sensed plume images) can be stored in data store 214 (shown as 214') for subsequent analysis in predictive maintenance.

The virtual sensing deep neural network 102 can be based on any type of machine learning or artificial intelligence system including, and not limited to, convolutional neural networks, autoencoders, recombinant neural networks, long-term short-term memory (LSTM) networks. Virtual sensing deep neural network 102 can be implemented via a process-ing unit (e.g., processor) configured to execute computer-readable instructions. In its most basic configuration, the processing unit includes at least one processing circuit (e.g., core) and system memory. Depending on the exact configu-ration and type of computing device, system memory may be volatile (such as random-access memory (RAM)), non-volatile (such as read-only memory (ROM), flash memory, etc.), or some combination of the two. The processing unit 206 may be a standard programmable processor that per-forms arithmetic and logic operations necessary for the operation of the computing device. As used herein, process-ing unit and processor refers to a physical hardware device that executes encoded instructions for performing functions on inputs and creating outputs, including, for example, but not limited to, microprocessors (MCUs), microcontrollers, graphical processing units (GPUs), and application-specific circuits (ASICs).

While instructions may be discussed as executed by a processor, the instructions may be executed simultaneously, serially, or otherwise executed by one or multiple proces-sors. The processing unit may also include a bus or other communication mechanism for communicating information among various components of the computing device. In some embodiments, the processing unit 206 is configured with co-processors (e.g., FPGA, ASIC) or AI-processors.

System (e.g., 202, 202') can include but is not limited to solid propellant rocket motors (e.g., missiles) or jet engines (e.g., turbojet, turbofan, ramjet, pulse jet, scramjets, etc.) for aerospace platforms such as fixed-wing, rotorcraft, launch vehicles, uncrewed aerial vehicles. System (e.g., 202, 202') can also include combustion engines (e.g., internal combus-tion engines, steam engines, turbine engines) for fleet vehicles such as big-rig trucks, oil transport trucks; sea vessels or nautical vehicles such as boats, submersibles; various land vehicles such as automobiles, sport utility vehicles, trucks; and other vehicles. System (e.g., 202, 202') can include power generation equipment such as gas turbines, steam turbines, large-scale diesel engines.

Test system 108 is a functional equivalent to System 202, 202' preferably having similar physics and method of operation. Similar and non-identical sensors and sensor hardware configurations can be employed. The proof-of-concept illustrates that virtual sensing deep neural networks can be developed for classes of machinery and rockets rather than specific machines or rockets. For example, for a solid propellant rocket motor (116), a smaller-scale test system comprising a smaller-scale solid-propellant rocket motor as compared to a commercial system can be instrumented to train the virtual sensing deep neural networks. In the example provided herein, shock sensing was evaluated for smaller-scale rocket motors. Indeed, shock sensing capabilities of the virtual sensing deep neural networks configured with the training data from the test rig can be applied to estimate the presence or localization of shocks for commercial rockets of that type. Similarly, test system 108 can be engineered mock-up of one or more subsystems located in System 202. For example, the test system 108 can be an instrumented jet engine, an internal combustion engine, or a combustor of a gas turbine to evaluate for misfiring, blow off, and flameout among other issues.

EXPERIMENTAL RESULTS AND EXAMPLES

Several studies have been conducted to develop and evaluate image processing and deep learning operations in predictive maintenance for aircraft or aeronautics vehicles. At least two studies were conducted in which each employed experimental data from a rocket motor test system in plume image analysis operations and neural network-based virtual sensors that together provide virtual sensing data (e.g., shock detection) from rocket motor sensor data and plume images. In both of these studies, the rocket motor sensor data are acquired in a hot-fire test rig that employed a scaled-down rocket motor. In a first study, a smaller rocket motor test rig was employed and utilized one type of image processing and neural network-based virtual sensors. In a second study, a larger rocket motor test rig was employed and utilized another type of image processing and neural network-based virtual sensors.

Each of the test rigs was configured with sensors to collect data on thrust, acceleration, surface temperature, and pressure. The studies provide proof-of-concept, via small rocket motor data, that the exemplary neural network-based virtual sensors and methods can be applied to commercial rocket motors. The studies also provide proof-of-concept, via the rocket motor data, that the exemplary neural network-based virtual sensors and methods can be broadly applied to other combustion systems, including internal combustion engines and jet engines, among others described herein.

The studies confirmed that virtual sensing deep neural networks can be used to reconstruct physical sensors on rocket motors within a set of controlled tests. That is, the virtual sensing deep neural networks in combination with the testing and development topology can produce estimated results for phantom sensors that do not exist and in a manner with high level of accuracy to which controls, predictive maintenance operations and decisions, and other system analytics can be based.

Indeed, the exemplary virtual sensing method and system facilitate the production of a new generation data, e.g., in-flight data in a hostile environment of a vehicle, such as in the hot-gas path or combustion sections of a motor or engine, without the need for physical sensors or adaption of the motor or engine for such data acquisition. Rather, sensors located in a non-hostile or less hostile environment of the vehicle, and which can also be readily available in the motor or engine, can be provided to a trained virtual-sensing deep neural network configured to generate the virtual data without the need for sensors at all desired locations. The exemplary virtual sensors can be used to control or modify the operations of solid rocket motor propulsion, predict rocket performance, and provide multi-modal evaluation capabilities for maintenance, enhanced plume diagnostics, and predictive analysis on the entire solid motor system. Virtual sensing can notably improve controls and predictive maintenance (e.g., in Health and Status Monitoring (HSM) systems) in providing virtual sensor data for the hostile environment of a vehicle, such as in the hot-gas path or combustion sections of a motor or engine, that can put the greatest wear on the motor or engine, but which are not sensed in real-time. The studies also show that virtual sensing can be used to provide useful, repeatable, and extensive data sets to predict rocket and motor performance during the design of such systems. They can also be used to generate more proactive plans for propulsion system maintenance, upgrades, and replacements and can potentially reduce downtime and failures.

Figure 4A:
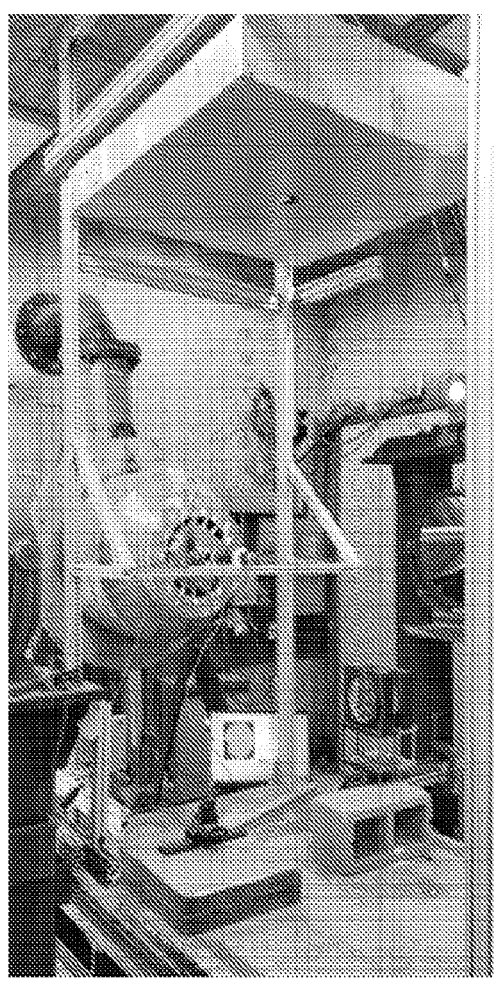
FIGS. 4A and 4B show a first test facility of a study conducted to evaluate and develop virtual sensing deep neural networks in accordance with an illustrative embodiment.
Figure 4B:
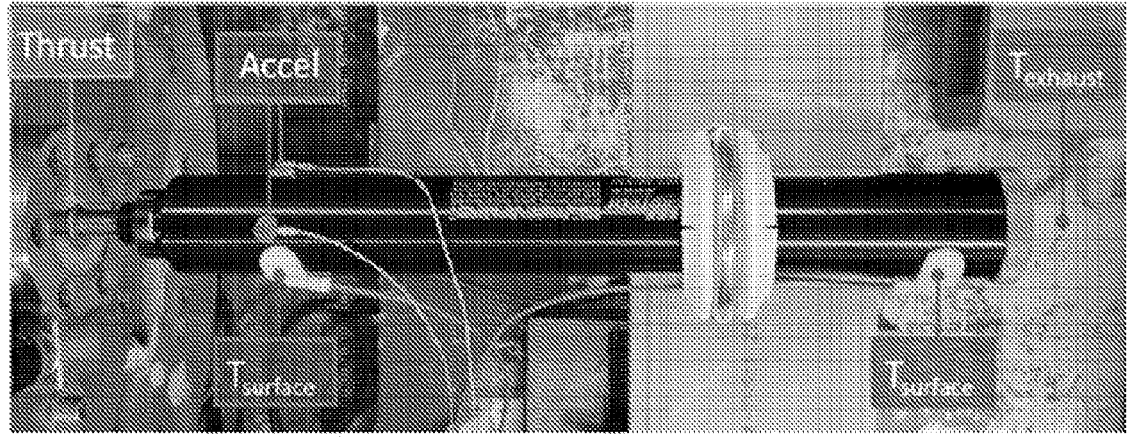
Figure 4C:
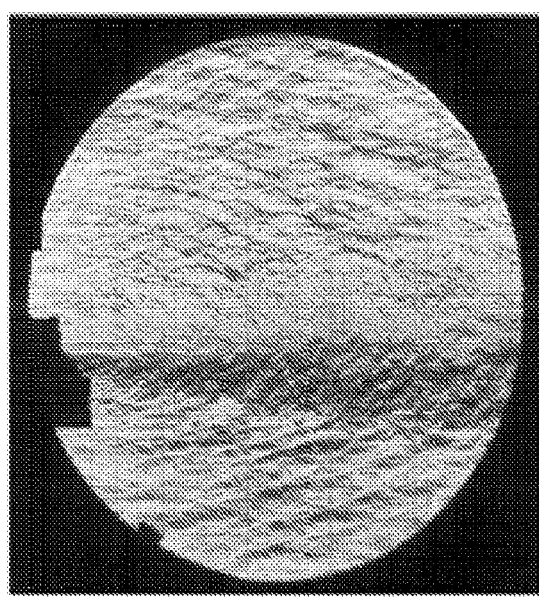
FIGS. 4C-4E show example sensor data acquired from the first test facility of FIGS. 4A and 4B.
Figure 4D:
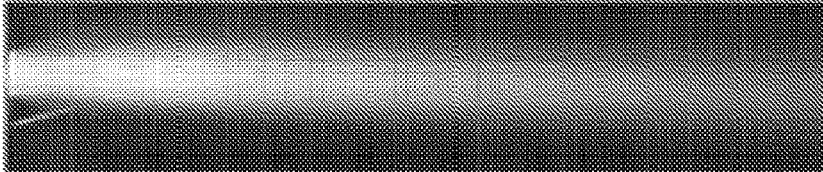
Figure 4D:
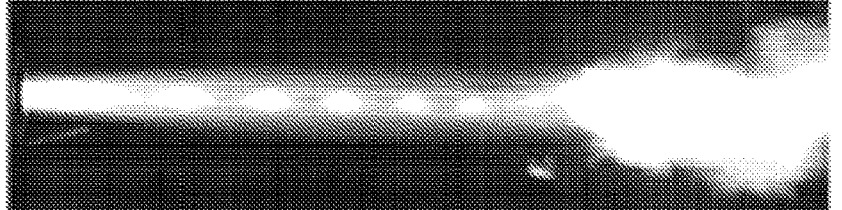
Figure 4E:
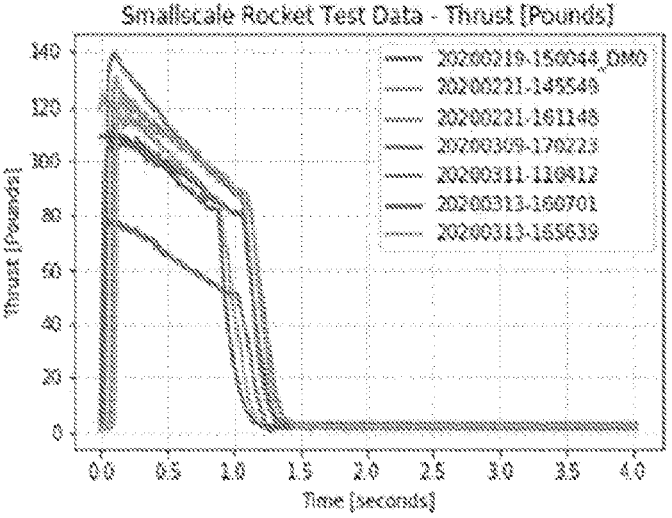

In the first study, a sub-scale test facility was designed for testing 38 mm diameter rocket motors. FIGS. 4A and 4B show two photographs of the sub-scale test facility of the first study. The first study acquired data from 7 commercially available Aerotech 1435T-M motors to provide 1.3 seconds of thrusting time for each test. The motor assembly was instrumented with a 500 lb (Omega LCHD-500) load cell, 500 g accelerometers (PCB 352A21), K-type Omega thermocouples at the surface, and exhaust to collectively measure thrust, acceleration, and temperature. FIG. 4C shows an example high-speed Schlieren imaging for flow visualization using light refraction relating to the gradient of density for flowing systems. FIG. 4D shows example plume luminosity imaging acquired at 30k frames per second with a 1 μs exposure. The outlet of the rocket motor nozzle is centered on the left side of the image, and the plume is exhaust to a plume analysis for each test. Acoustic beamforming data was acquired for 24 microphones in an array. FIG. 4E shows example acquired thrust data acquired for the seven rocket motor tests.

Figure 4F:
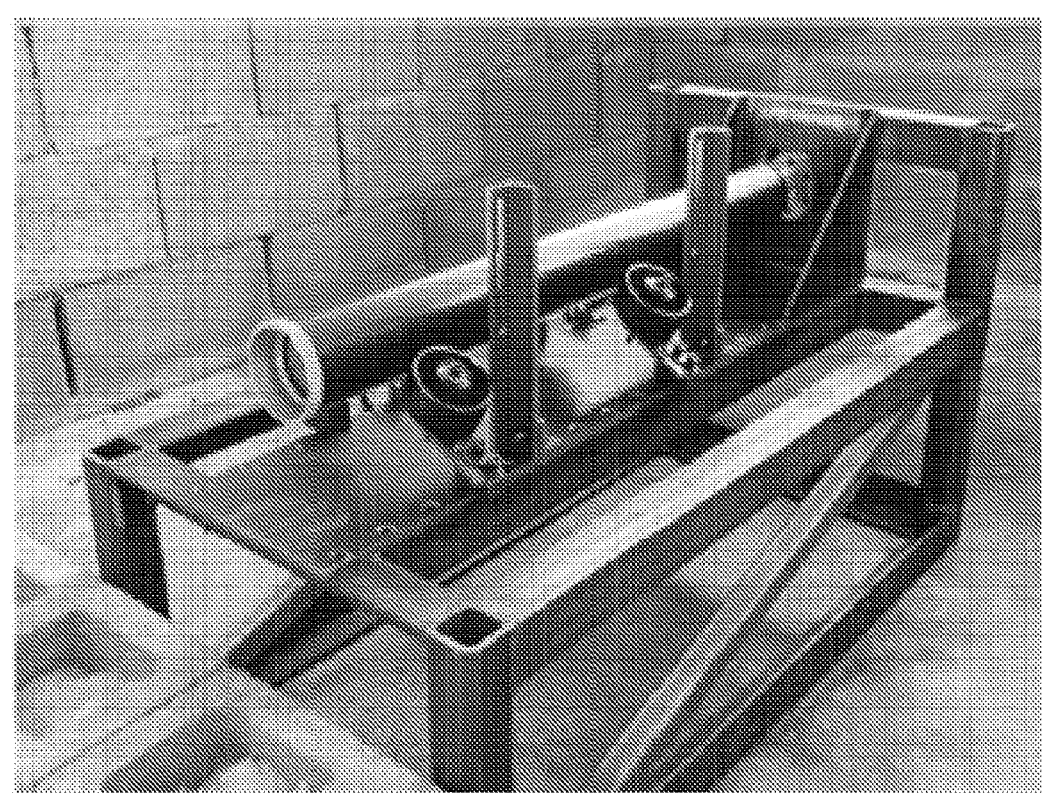
FIGS. 4F and 4G show a second test facility of a second study conducted to evaluate and develop virtual sensing deep neural networks in accordance with an illustrative embodiment.
Figure 4G:
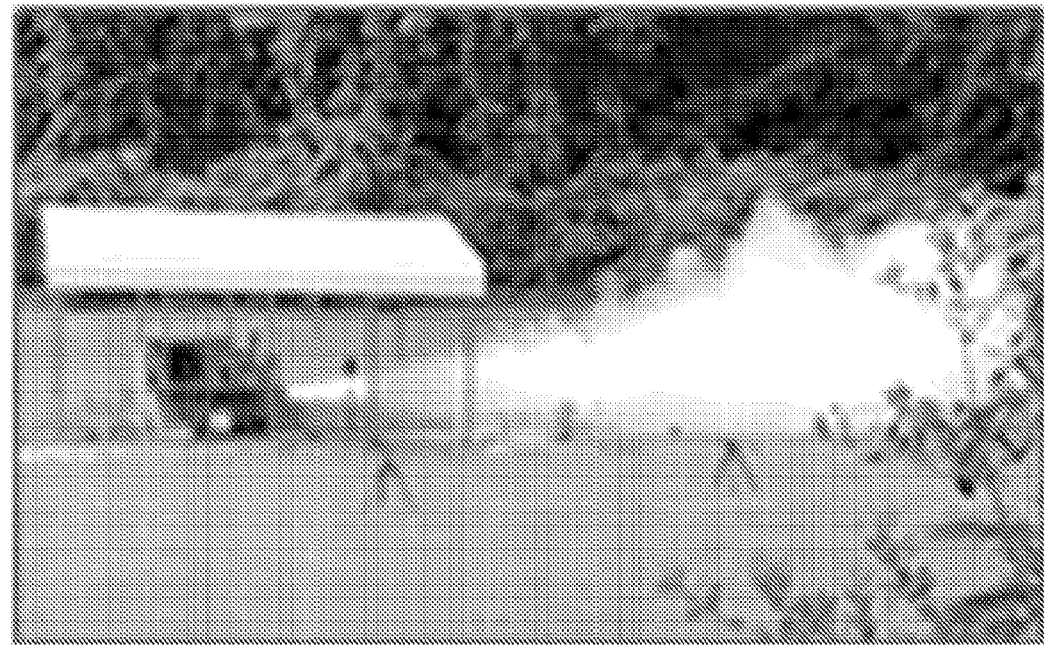
Figure 4H:
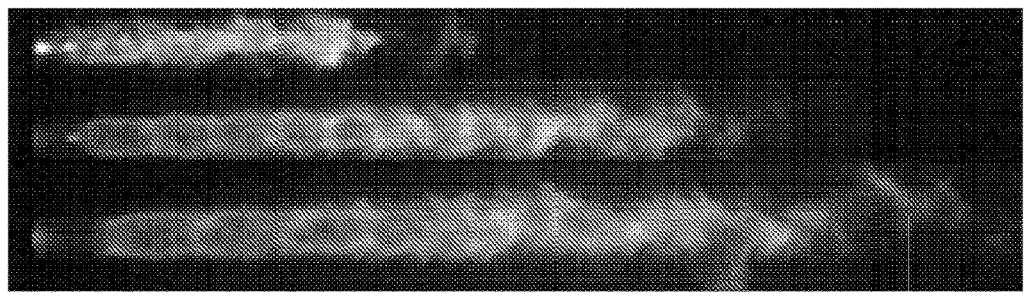
FIGS. 4H-4J show example sensor data acquired from the second test facility of FIGS. 4F and 4G.
Figure 4I:
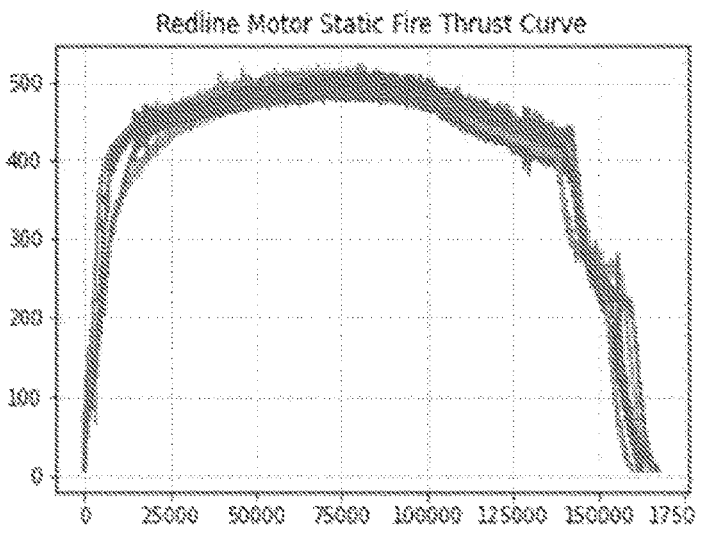
Figure 4J:
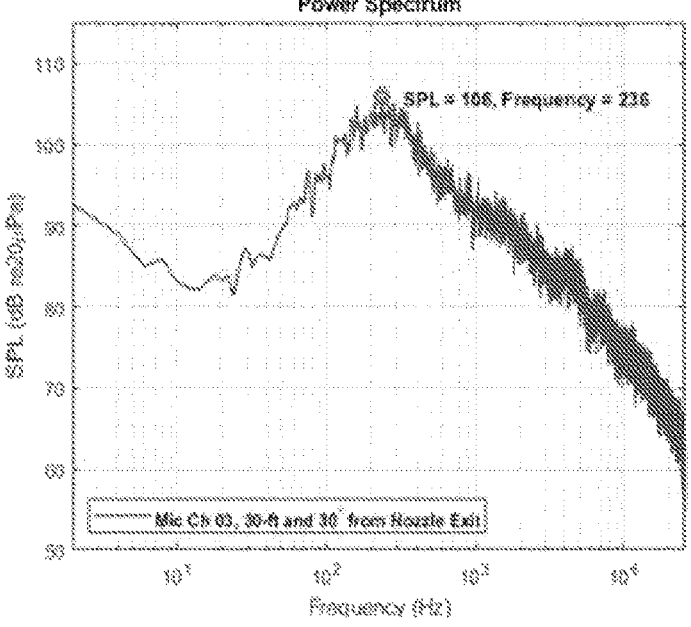

In the second study, a large-scale outdoor test stand was simultaneously developed to accommodate motors up to 96 mm in diameter. This test stand utilizes the same sensor suite and similar optical diagnostic techniques. Specifically, the large-scale outdoor solid rocket static test stand shown in FIG. 4F was fabricated and instrumented to measure thrust, motor casing vibration at two orthogonal locations, internal chamber pressure, far-field acoustics, and broad-band plume luminosity. A set of AeroTech ammonium perchlorate motors were tested, including Redline motors containing strontium and Mohave Green motors using boron for color additives. The results of the study are a complete set of solid rocket motor static testing data. FIG. 4G shows data acquisition of the large-scale outdoor test stand during a test. FIG. 4H shows an example ignition sequence from the high-speed plume imaging for a rocket motor. As the motor is ignited and pressurized, the plume ignites and is shown with closely-spaced shocks. As the motor continues to pressurize and the velocity increases, the shocks become farther spaced. FIG. 4I shows static fire thrust data acquired of the rocket motor. FIG. 4J shows acoustic measurement data acquired from the rocket motor.

In the two studies, several implementations of neural network-based virtual sensors were developed and evaluated to reconstruct the virtual sensing plume images and the other virtual sensing sensors (thrust, pressure, temperature). The first neural network-based virtual sensors (of the first study) employed LSTM-based neural networks to generate virtual sensing plume images. The image processing employed (i) gamma expansion to isolate the brightness of the shocks and (ii) edge detection algorithms to identify the shapes of the shocks.

The second neural network-based virtual sensors (of the second study) employed autoencoder-based neural networks to generate virtual sensing plume images. The image processing employed (i) superpixel analysis and (ii) contour detection to identify the shapes of the shocks. The first study shows that the first neural network-based virtual sensors can detect shocks close to the nozzle. It was observed that the LSTM network of the first neural network-based virtual sensors was susceptible to overfitting because the intensity of the rocket plume can decrease as the distance from the nozzle increase. To this end, the first neural network-based virtual sensors did not accurately detect shocks that are formed farther from the nozzle. Additional description of the contour detection analysis is described in David Pendleton, Austin Himschoot, Malik Saafir, "Virtual-Sensing for Integrated Predictive Reliability (VIPR)," IRAD Journal 2020 in U.S. Provisional Patent Application No. 63/068,461.

The second neural network-based virtual sensors and superpixel-based image analysis operation improved the accuracy of the virtual sensor and addressed any under-whelming response of the first system. From both studies, virtual sensing of thrust, pressure, temperature sensors were demonstrated with reasonable performance. It was observed that the superpixel-based image analysis operation (of the second study) could determine the distances from a first observed shock to the end of the nozzle to derive virtual-sensed internal pressure and the angle of the shocks needed to derive Mach number. Generally, internal characteristics such as internal pressure and Mach number are derived in order to ensure that a rocket or motor is maintaining suffi-cient functionality. The study developed the superpixel-based image analysis as an unsupervised detection/learning model that can locate shocks via annotations of image frames to assess for the points of the angle in the plume image to which metrics of the engine can be derived using these shocks.

Two neural networks were evaluated for sensor recon-struction: (i) Recurrent neural network (RNN) with bidirec-tional long short-term memory (LSTM) and (ii) 1dCNN. In the study, 1dCNNs were reproduced from those described in [3, 28].

RNN with bidirectional LSTM layers was used to recon-struct temporal sensor data by providing insight on previous and future data points connected to the current record. In the study, the base model was created using Keras APIs and included two LSTM layers accompanied by two dropout layers. The dropout layers, used to reduce overfitting, were placed directly after each LSTM. The parameters estimated from these layers were then combined using two consecutive dense layers which together would output a prediction of the virtual sensor data. Further description of RNN with bi-directional LSTM can be found in [10].

Along with the hyperparameters, the study evaluated different numbers of and different types of layers to mini-mize validation loss. Models with between one and four LSTM layers and LSTM layers wrapped in bi-directional layers were evaluated. A bi-directional layer allows the neural network to create two hidden layers going in opposite directions. Therefore, the network can get both information from the future and the past to evaluate the current data point. The dropout layers always accompanied the LSTM layers, so the number of LSTM layers was the same as the number of dropout layers. Between one and three dense layers were tested. The final architecture of layers in the study included two LSTM layers wrapped in the bi-direc-tional layers accompanied by two dropout layers with two final dense layers and a flatten layer to correct for dimension in between. The general activation function for the hidden layers of a neural network was set as a hyperbolic tangent function and a softsign activation function. This activation function was $f(x)=x/(|x|+1)$. Softsign was observed to train the model with better results and faster.

Figure 5:
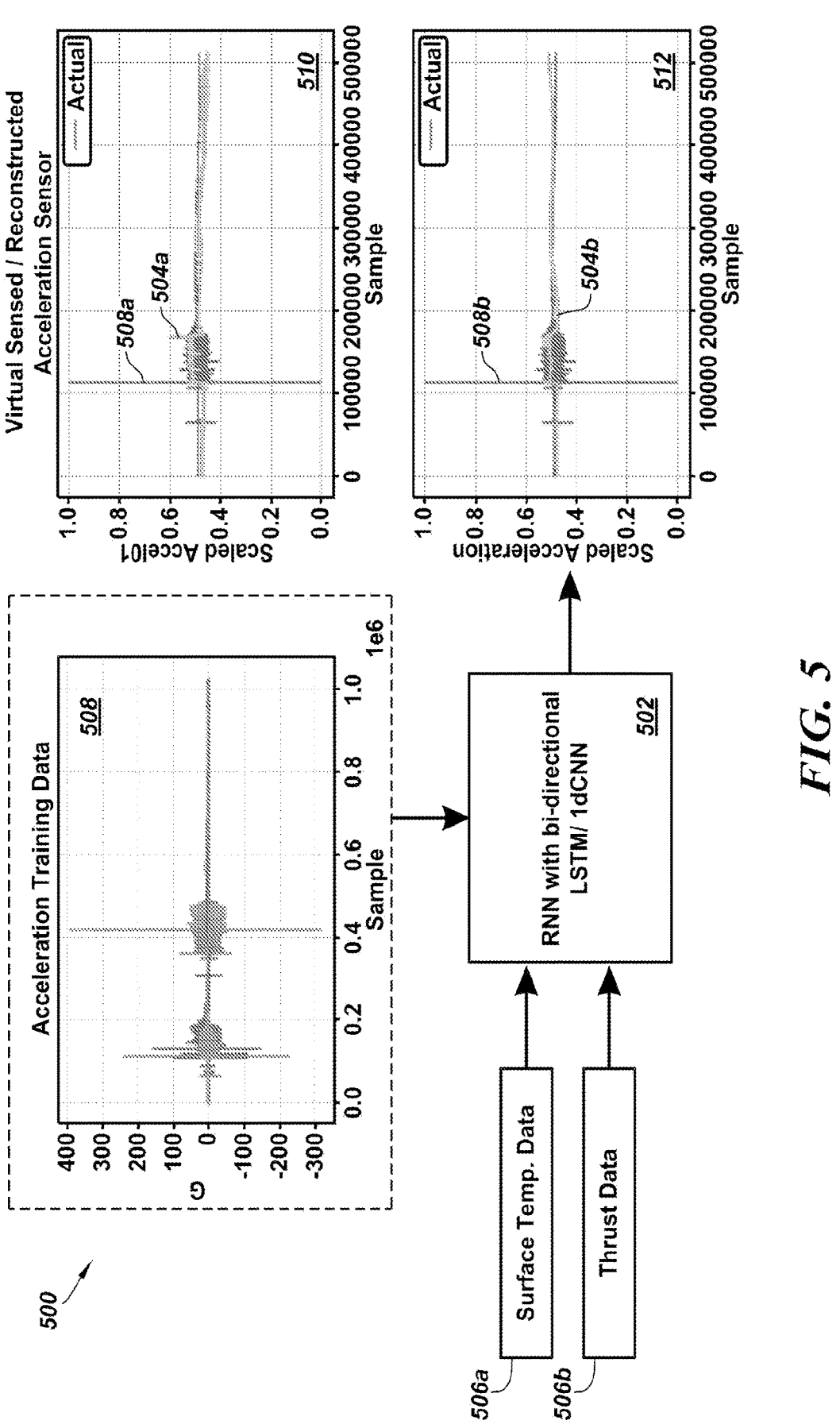
FIGS. 5, 6, and 7 each shows example virtual sensing deep neural network systems configured to generate virtual sensed acceleration data, virtual sensed surface temperature data, and virtual sensed thrust data, respectively, of rocket motors in accordance with an illustrative embodiment.
Figure 5:
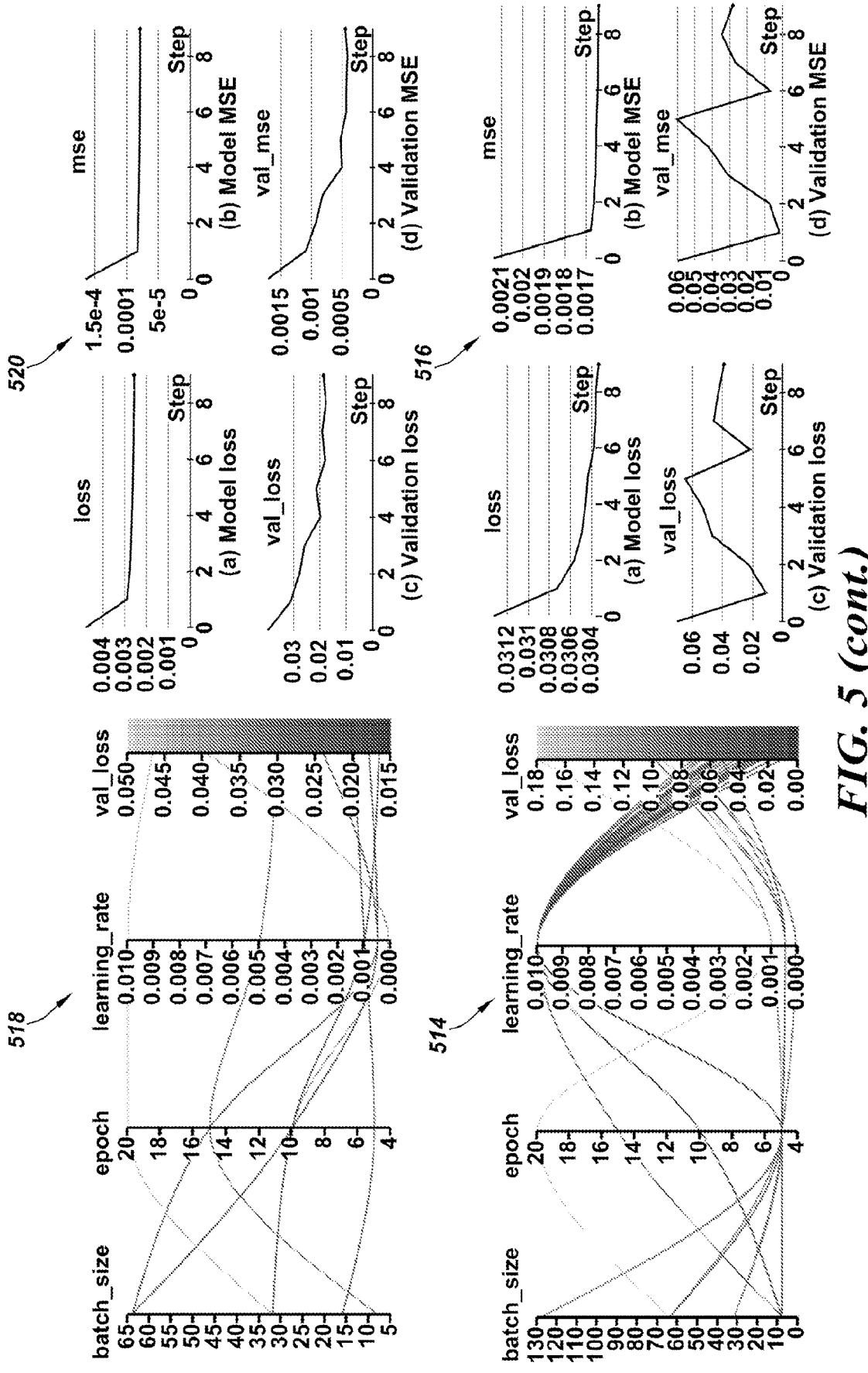
Figure 6:
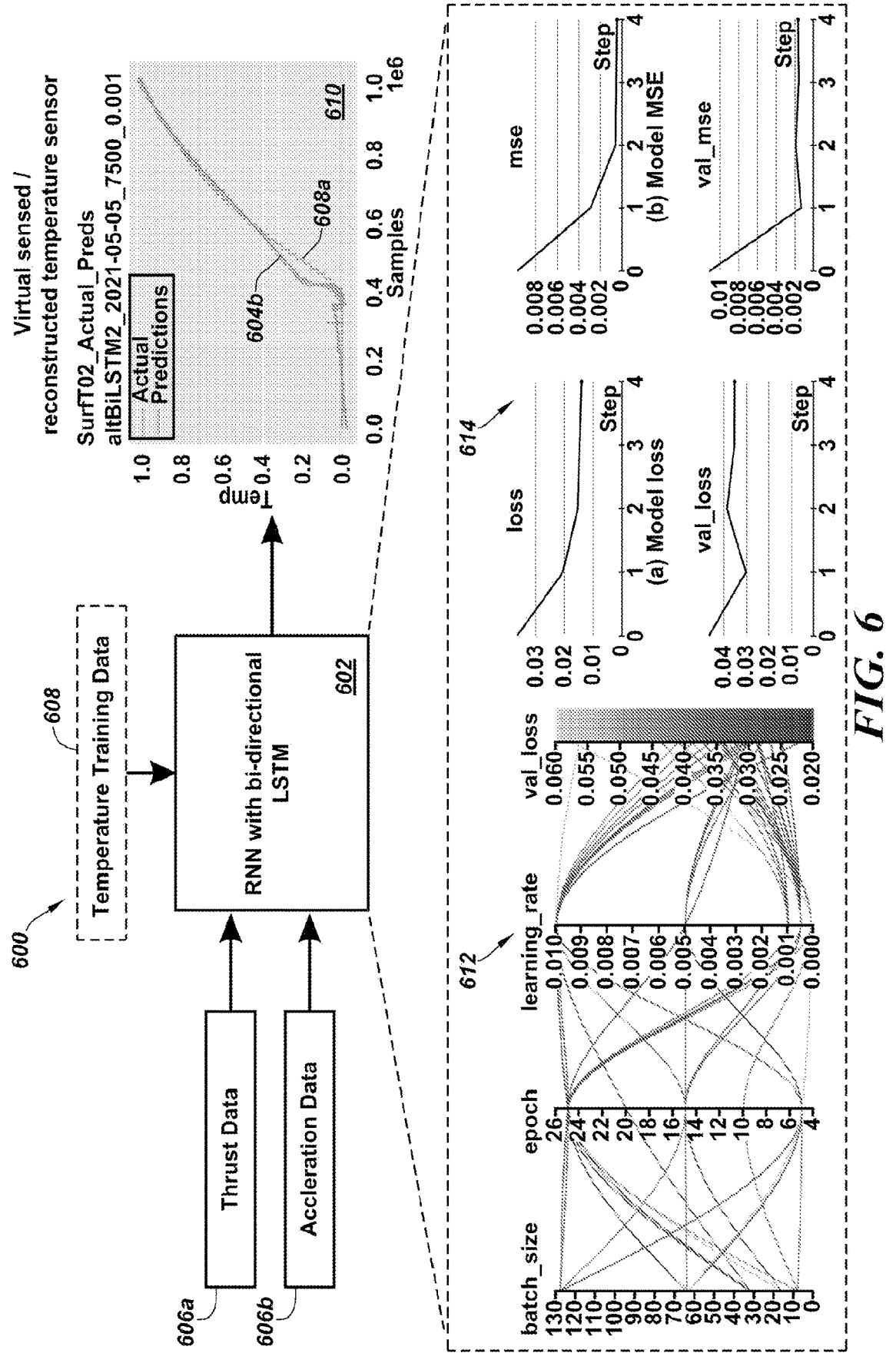
Figure 7:
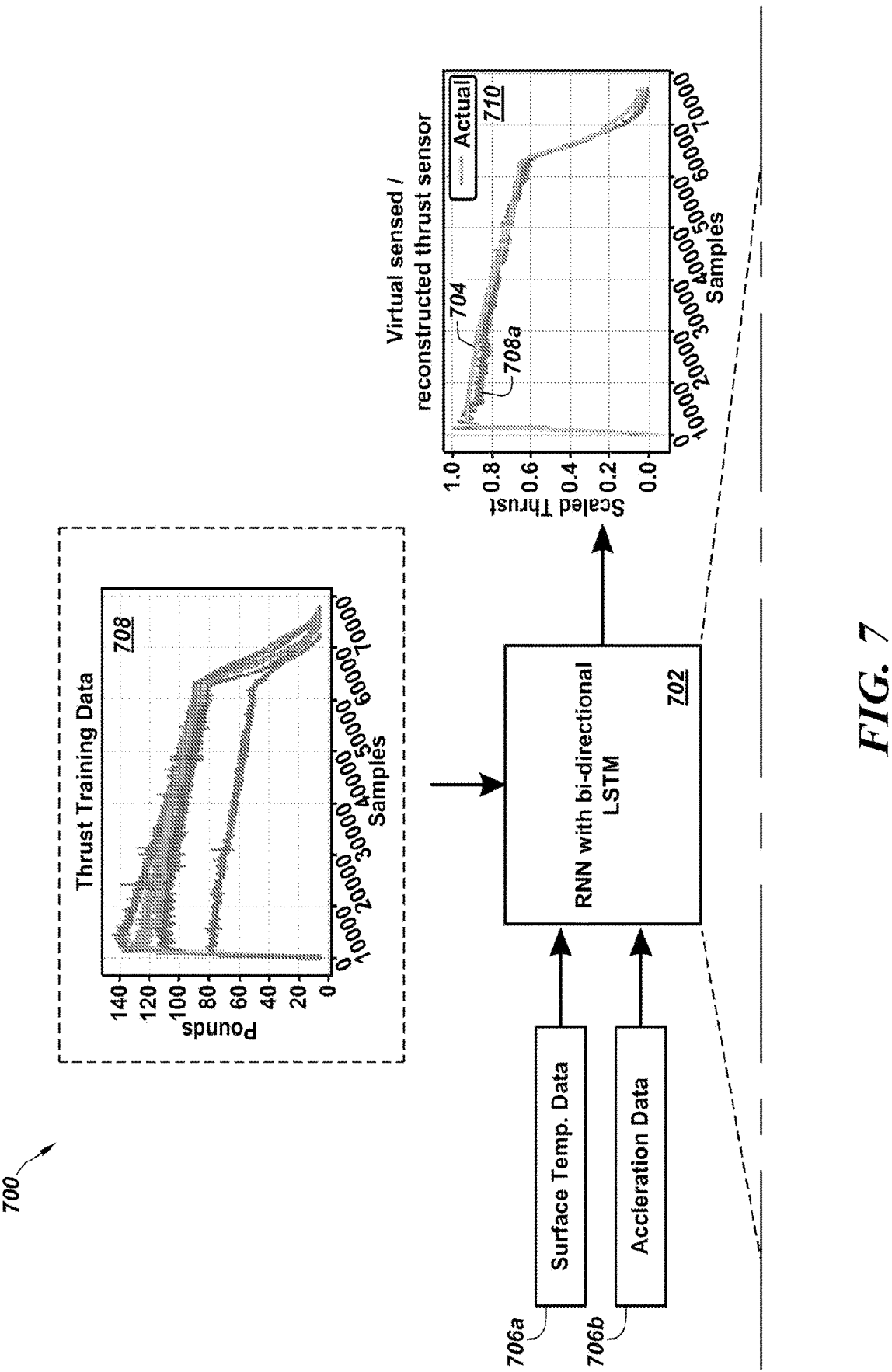
Figure 7:
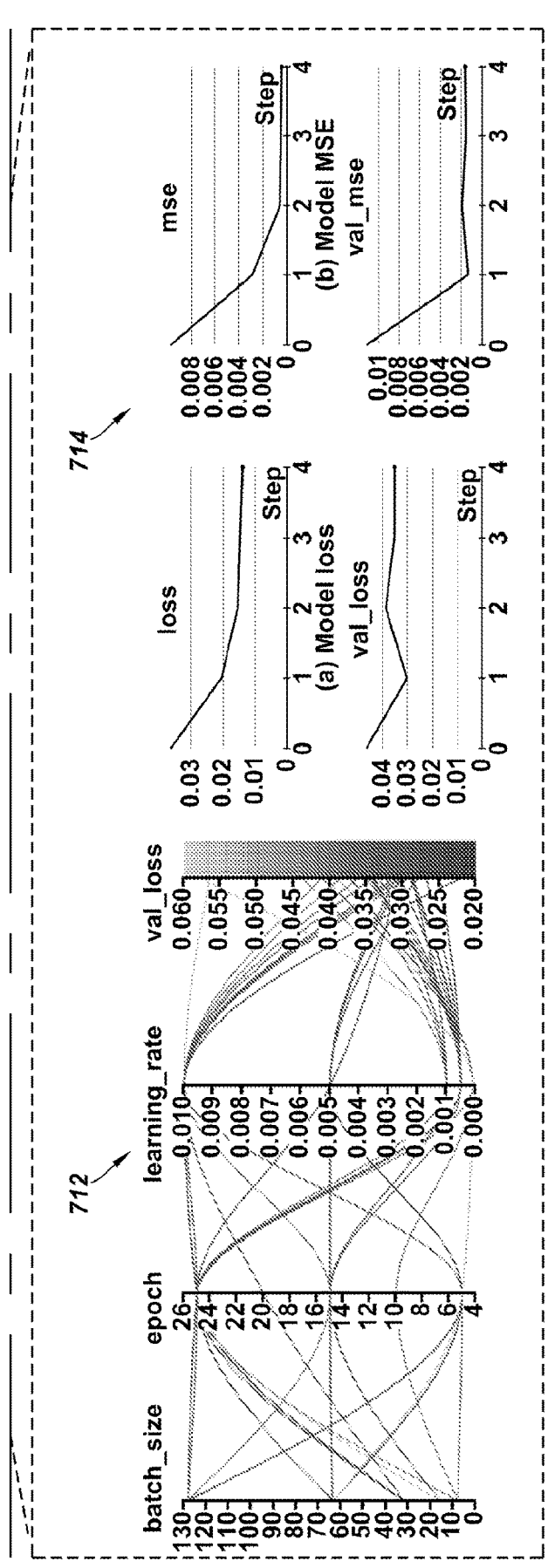
Figure 8A:
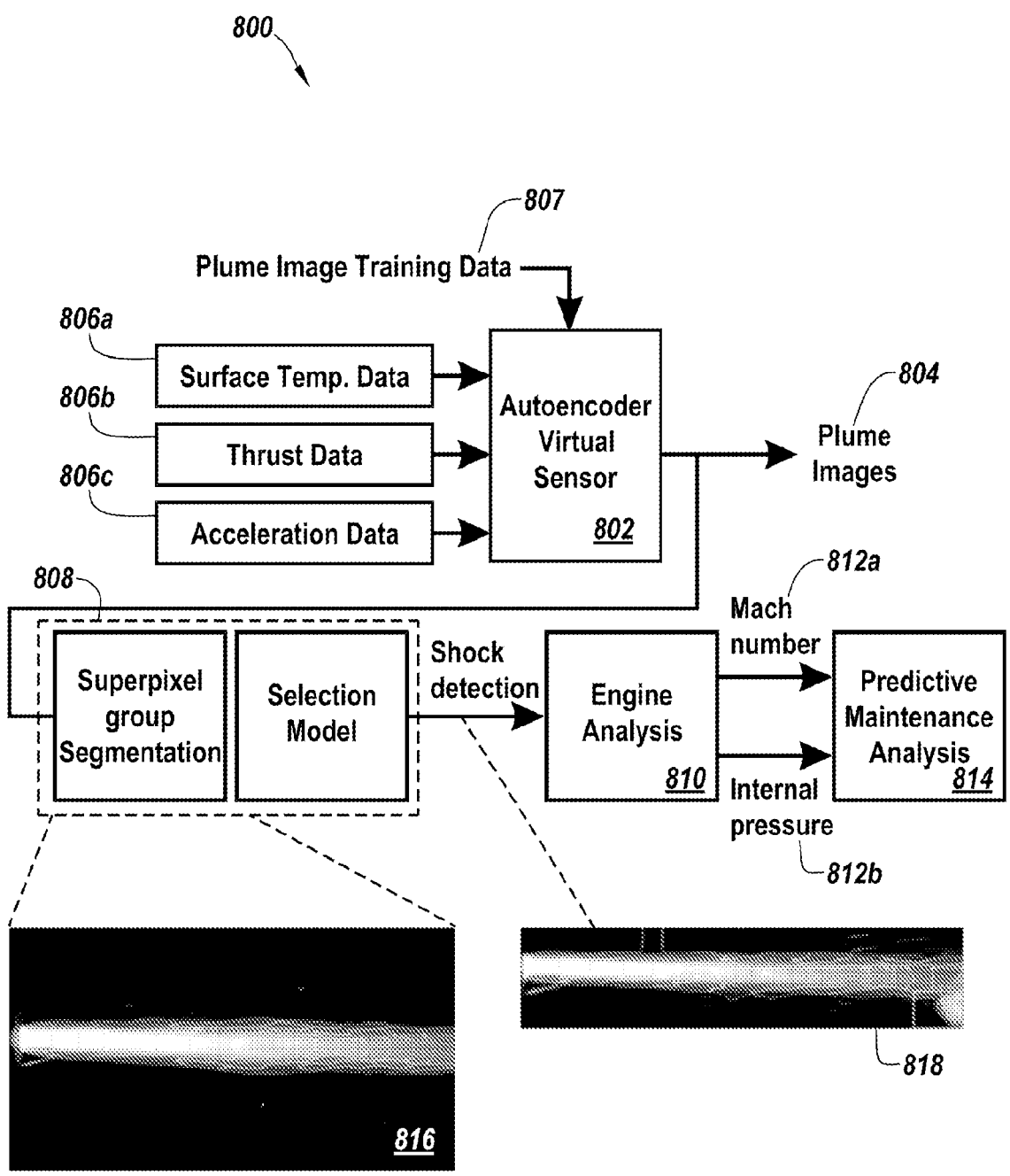
FIGS. 8A-8E and FIG. 9 show an example virtual sensing deep neural network-based system configured to generate virtual sensed plume image data of rocket motors, e.g., for used in predictive maintenance or controls in accordance with an illustrative embodiment.
Figure 8B:
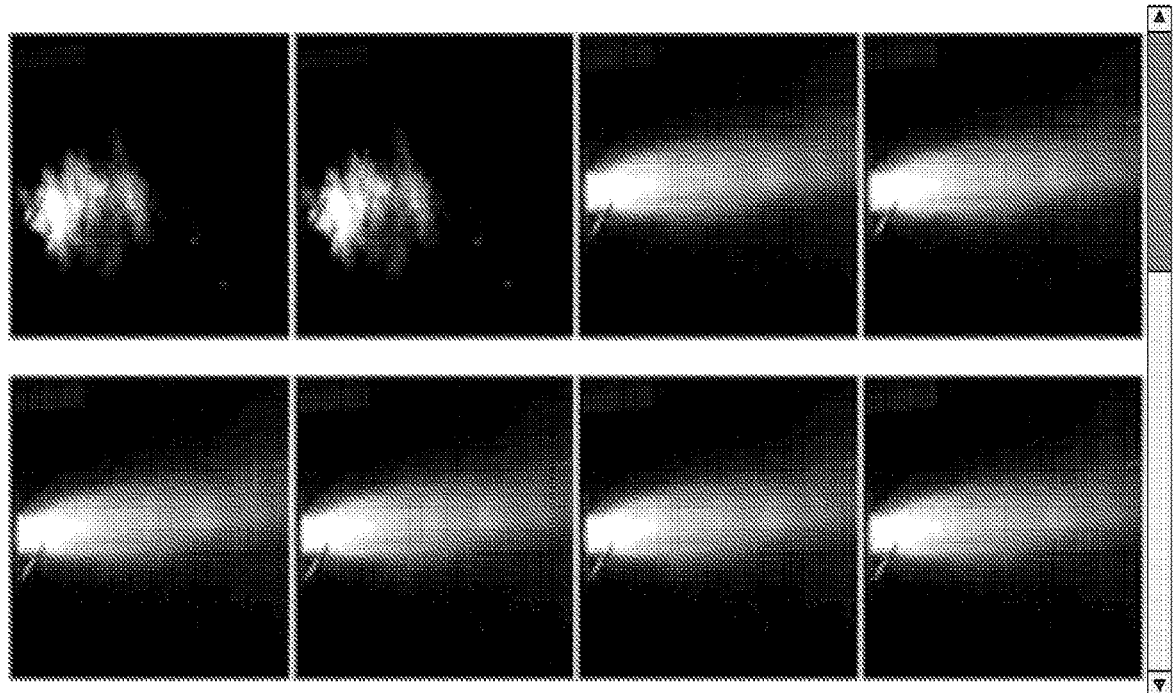
Figure 8C:
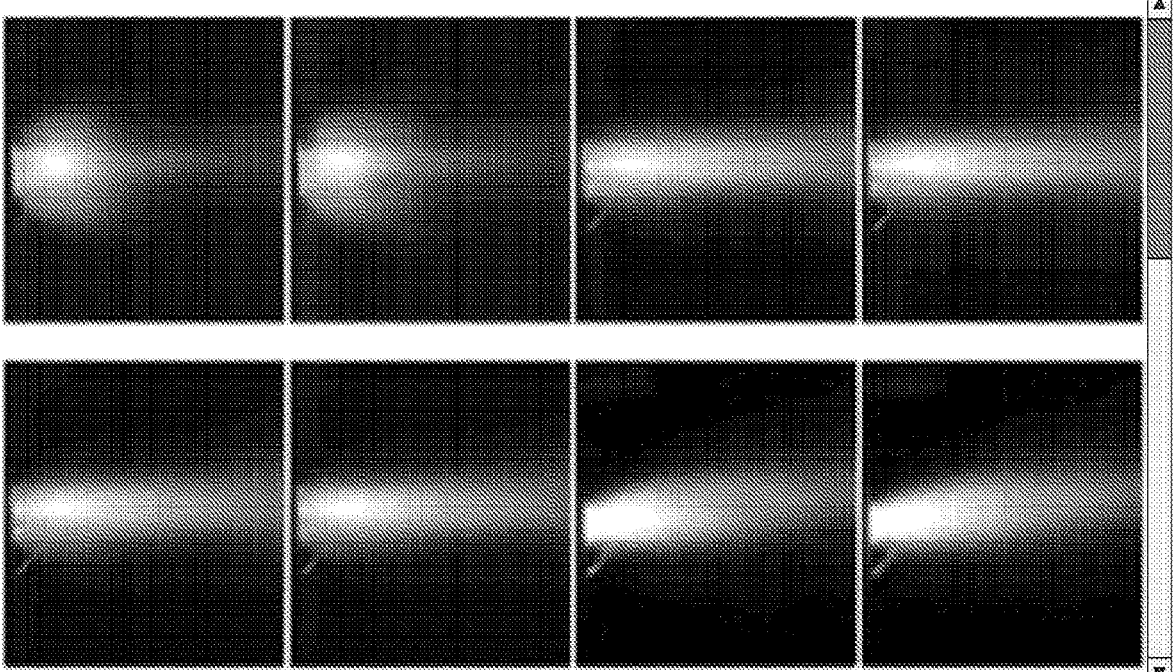
Figure 9:
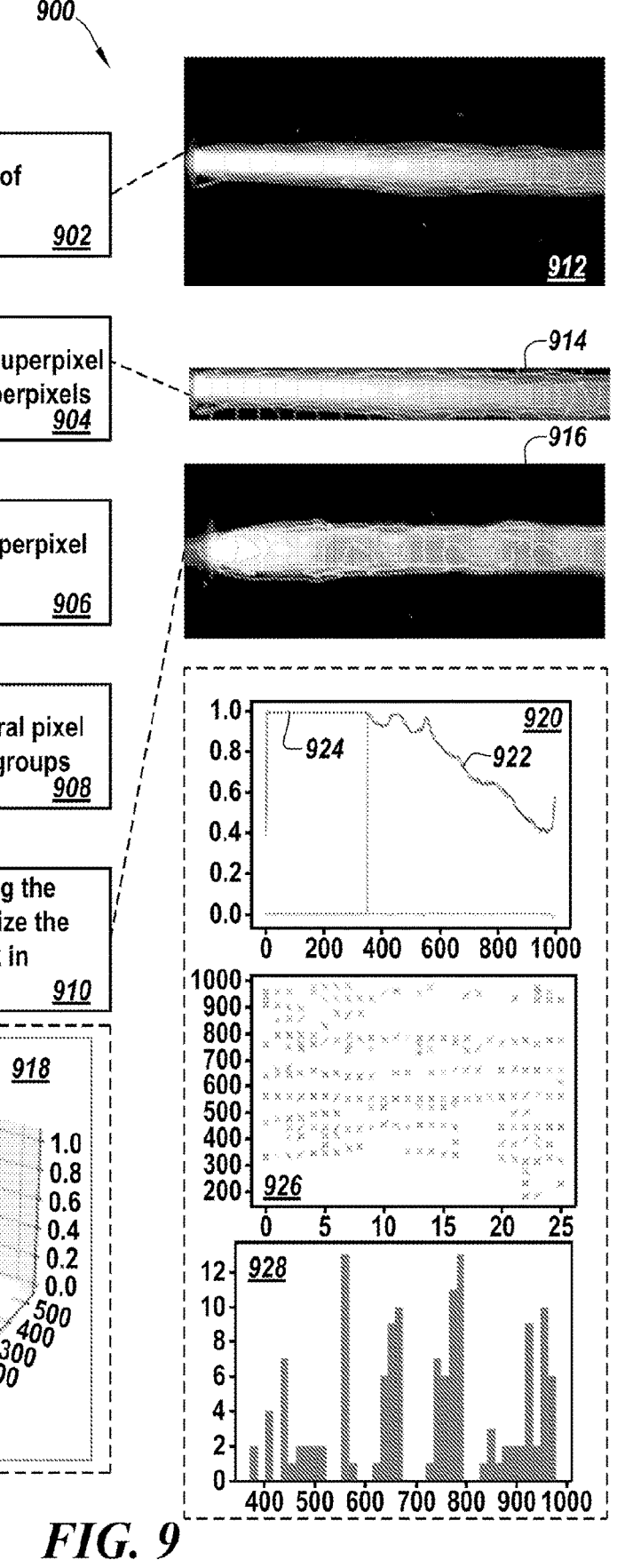

FIG. 5 shows an example virtual sensing deep neural network employed in the study to reconstruct acceleration data of the rocket motor using surface temperature and thrust data. FIG. 6 shows an example virtual sensing deep neural network employed in the study to reconstruct surface tem-perature data of the rocket motor using thrust data and acceleration data. FIG. 7 shows an example virtual sensing deep neural network employed in the study to reconstruct thrust temperature data of the rocket motor using surface temperature data and acceleration data. Indeed, these three proofs-of-concept virtual sensing deep neural networks can be applied to other sensor configurations, e.g., acoustic data, fuel flow, etc. FIGS. 8A-8C show an example virtual sensing deep neural network employed in the study to reconstruct. FIG. 9 shows superpixel-based image analysis operations that can be performed on virtual sensing plume images (as well as camera acquired plume images) to determine the presence and localization of shocks that can be used to determine the Mach number or internal pressure of the jet engine or rocket motor.

Example #1: Virtual Sensed Acceleration Data

FIG. 5 shows a virtual sensing deep neural network system 500 configured to generate virtual sensed accelera-tion data of rocket motors using a virtual sensing deep neural network 102. FIG. 5 also shows metrics associated with the training. In the example of FIG. 5, experimental results (504) for two virtual sensing deep neural networks 102 (shown as "RNN with bi-directional LSTM/1dCNN" 502) are shown to generate virtual sensed acceleration data 504 (shown as 504*a* and 504*b*) from sensor data 506 (shown as surface temperature data 506*a* and thrust data 506*b*). Accel-eration training data 508 (shown for six rocket motors) were concurrently acquired from the test cells as described in relation to FIG. 4 along with surface temperature data 506*a* and thrust data 506*b* and are used only for the training. As observed in data 508, the data is stochastic in nature, making it difficult to reconstruct. As shown in plots 510 and 512, overcoming the stochastic nature of the data, the virtual sensed acceleration data 504*a* and 504*b* tracks the actual sensed acceleration data 508 (shown as 508*a* and 508*b*).

FIG. 5 as a proof-of-concept illustrates that sensor data (508) can be accurately reconstructed as virtualized sensors from other concurrently acquired sensor data 506 using a virtual sensing deep neural network 102.

1dCNN. 1dCNN model was tuned over the same param-eters as the thrust biRNN, with the combination shown in plot 514. The hyperparameters that generated the minimum validation loss includes: batch size=32, epochs=10, learning rate=0.001. The resulting model summary for the 1dCNN trained using the tuned hyperparameters is provided in plot 520. The output of the 1dCNN is shown as 504a.

Bidirectional LSTM RNN. The bi-directional LSTM RNN model was tuned over the same set of parameters shown in plot 518. The hyperparameters that generated the minimum validation loss include: batch size=8, epochs=5, learning rate=0.01. The resulting model summary for the 1dCNN trained using the tuned hyperparameters is provided in plot 516. The output of the 1dCNN is shown as 504b.

Example #2: Virtual Sensed Surface Temperature Data

FIG. 6 shows another virtual sensing deep neural network system 600 configured to generate virtual sensed surface temperature data of rocket motors using a virtual sensing deep neural network 102. In the example of FIGS. 6, experimental results (604) for a virtual sensing deep neural network 102 (shown as "RNN with bi-directional LSTM" 602) is shown to generate virtual sensed surface temperature data 604 from sensor data 606 (shown as thrust data 606a and acceleration data 606b) acquired from the small-scale testbed described in relation to FIG. 4. Surface temperature training data 608 were concurrently acquired from the test cells along with thrust data 606a and acceleration data 606b and are used only for the training. As shown in plot 610, the virtual sensed surface temperature data 604 (shown as 604b) tracks the actual sensed thrust data 608 (shown as 608a).

Table 1 shows the hyperparameter space used to generate the virtual sensing deep neural network 602.

TABLE 1

| | |
|---|---|
| Number of Bidirectional LSTM Layers | 1 |
| Number of Units (in a LSTM) | 48 or 36 |
| Learning Rate | 0.0001 or 0.001 |
| Dropout Rate | 0.2 |
| Batch Size | 7500 |
| Number of fully connected layers | 2 |
| Number of neurons in fully connected layers | (96,50); (50,1) |
| Optimizer | Adam |
| Loss Function | MSE Loss |

Example #3: Virtual Sensed Thrust Data

FIG. 7 shows another virtual sensing deep neural network system 700 configured to generate virtual sensed thrust data of rocket motors using a virtual sensing deep neural network 102. FIGS. 7B and 7C show metrics associated with the training. In the example of FIGS. 7, experimental results (704) for a virtual sensing deep neural network 102 (shown as "RNN with bi-directional LSTM" 702) is shown to generate virtual sensed thrust data 704 from sensor data 706 (shown as surface temperature data 706a and acceleration data 706b) acquired from the small-scale testbed described in relation to FIG. 4. Thrust training data 708 (shown for 6 rocket motors) were concurrently acquired from the test cells along with surface temperature data 506a and thrust data 506b and are used only for the training. As shown in plot 710, the virtual sensed acceleration data 704 tracks the actual sensed thrust data 708 (shown as 708a).

In the study, the data for each of the six rocket motor tests were preprocessed by trimming to the active firing range of samples, and scaling was adjusted between values of 0 and 1. Five experiments were used for training (see data 708), and one additional experiment data (708a) was used for testing and validation during the prediction stage. Each sensor (706a, 706b), excluding the thrust data itself, was passed into the model (702) and was used as a feature to reconstruct the thrust sensor. The model (702) was tuned using a weights-and-biases platform to perform a hyperparameter sweep (shown in plot 712) to minimize the validation loss (MAE) of the model (shown in plot 714). In plot 712, the tuning of the model is shown with respect to hyperparameters, batch size, number of epochs, and learning rate. From the study, the hyperparameters that produced the minimum validation loss include batch size=64, epochs=5, learning rate=0.01. The resulting model summary for the tuned number of epochs, learning rate, and batch size are shown in plot 714.

FIG. 7 as a proof-of-concept illustrates that thrust sensor data (708) can be accurately reconstructed as virtualized sensors from other concurrently acquired sensor data 706 using a virtual sensing deep neural network 702.

Example #4: Virtual Sensed Plume Images

FIG. 8A shows a system to generate virtual sensed plume images of rocket motors using a virtual sensing deep neural network and to determine shock presence of localization using superpixel-based image analysis operation. FIGS. 8B-8C show experimental results in generating the virtual sensed plume images of rocket motors using a virtual sensing deep neural network. In the example of FIGS. 8A, an autoencoder-based neural network virtual sensor is employed, though other neural networks described herein can be employed. FIG. 9 shows superpixel-based image analysis operations and FIGS. 9B-9C show experimental results of an example superpixel-based image analysis performed in the study.

In the example of FIG. 8A, the system 800 includes (i) a virtual sensing deep neural network 102 (shown as "Autoencoder Virtual Sensor" 802) configured to generate virtual sensed plume images 804 from sensor data 806 (shown as surface temperature data 806a, thrust data 806b, and acceleration data 806c) and (ii) superpixel-based image analysis operations 808 configured to identify the presence or localization of shocks in the virtual sensed plume images 804. High-speed plume images 807 were used in the training of the virtual sensing deep neural network 802 only. The shock information can be employed in analysis 810 (shown as "Engine Analysis" 810) to determine parameters such as Mach performance 812a and internal pressures 812b of the engine for predictive maintenance (shown via "Predictive Maintenance Analysis" 814). In the example shown in FIG. 8A, the superpixel-based image analysis operation 808 is configured to segment the plume images into superpixels (shown in image data 816) to which segments are shown as bounding boxes of image data 818 can be selected by the algorithm.

FIGS. 8B and 8C show example validation test results, including input video frames of plume images (e.g., 804) used for the training with a given set of sensor data 806 and the reconstructed/virtual sensed plume images 807 generated from the same instance of the sensor data 806. Specifically, FIG. 8C shows the output of a standard autoencoder. FIG. 8C indeed shows that the virtual sensing deep neural network 802 can accurately generate virtual sensed plume image data from sensor data.

Superpixel-based Image Analysis Operations. FIG. 9 shows a method 900 to perform a superpixel-based image analysis operation. Method 900 includes (i) generating (902), via a cluster operation, an initial set of superpixel groups, (ii) consolidating (904) the initial set of superpixel groups and removing dark superpixels, (iii) generating (906), via the cluster operation, a revised set of superpixel groups, (iv) determining (908) the mean or central pixel location of the superpixel groups, and (v) selecting (910) the group as having the presence of shock to localize the determination of shock in a given plume.

A Simple Linear Iterative Clustering Algorithms (SLIC), e.g., as described in [1], which is incorporated by reference herein in its entirety, can be employed to generate (902) the set of initial superpixel groups. Superpixels (also referred to herein as a superpixel group) refer to a group of pixels that share common traits such as intensity. Superpixel analysis operation can be used to segment an image in which shock image data of a segment have the same intensity between them. Given the correct number of superpixels, all shocks would be contained within an isolated superpixel.

In the study, the Simple Linear Iterative Clustering Algorithm was configured with an initial target of 250 superpixel groups (see, e.g., image 912). Operation 902 can be similarly configured. Following clustering, superpixel groups can be combined (904) into a single superpixel (see, e.g., image 914) based on average brightness (e.g., average brightness being below a given threshold can be combined). The area of the new superpixel group can be condensed by taking the minimum rectangular area of non-dark superpixels (see, e.g., image 914). The SLIC algorithm can be re-executed (906). In the study, the SLIC algorithm was re-executed with a revised target of 200 superpixel groups. Next, the image processing operation 908 identifies and maps the remaining superpixels to their mean pixel location in the image. Then a superpixel selection algorithm is executed to output a set of the candidate means for superpixels by iterating through, in a provided sequence, the set of defined mean values for the set of superpixel groups. Examples of selection algorithms can include the Gaussian mixture model algorithm, signal processing-based selection algorithm.

Gaussian Mixture Model Selector. The Gaussian mixture model algorithm can cluster groups of 3D image distribution of pixel position and intensity as a sum of 2-dimensional normal distributions. Plot 918 shows an example 3D distribution of a plume image with shock wave present. The x and y-axes show the pixel locations, and the z-axis shows intensity values. The selection operation (910) can be made of candidate mean values (from operation 908) that match the means of the sub-distributions with large-scale coefficients.

Signal Processing-based Selector. A signal processing-based selector can be employed that can search relative peaks in intensity. In the study, a selector with a maximum filter range of 20 pixels was employed that can search for relative peaks within this range. The selector was observed to select shock candidates with a higher degree of accuracy. The selector can include logic to additionally reject candidate means located at the edges of the main flame near the nozzle and shocks of lower intensity.

1-Dimensional Signal-based Selector. The 1-Dimensional signal-based selector is configured to identify relative peaks as cross-sections of a 1-Dimensional signal image. In the study, it was observed that relative peaks were found from the vertical cross-sections of the image by sampling uniformly from the middle 50 percent of pixels. These cross-sections formed one main peak for ideally formatted shocks. These peaks would then form the range of pixel values for which the horizontal cross-sections were searched. For the horizontal cross-sections in this range, a Savitsky Golay filter was performed on the data to smooth the distribution.

Along with this smoothing, all points of intensity greater than 0.98 were set to intensity zero in order to remove the influence of the flare nearest the nozzle, the brightest area of the image. Plot 920 shows an example transformation (922) of the function (924). In plot 920, the relative peaks were then found with the prominence of 0.3, and the coordinates of the peaks were grouped into a histogram. Plot 926 shows a peak identified at each point within the range of vertical coordinates. Plot 928 shows the same as a histogram. Once selected, validation may be performed using detection algorithms, e.g., the Resnet-34 model, as outlined in [12].

In addition to being used in virtual sensing operations for predictive maintenance as shown in FIGS. 8 and 9, superpixel-based image analysis operations 808 can be used to annotate a large set of image frames to identify shocks in plume images.

Virtual Sensing Deep Neural Network. The plume image study evaluated autoencoders to develop a feature extracting network for video frame plume image data. Specifically, variational autoencoders (VAEs) and standard autoencoders were evaluated. Both of these autoencoders contain convolutional components to process the images. Autoencoders are networks with two parts: an encoder and a decoder. The encoder translates input data into a latent space with lower dimensionality, and the decoder takes the latent representation and attempts to reconstruct the original input from it. The performance is judged by a reconstruction error, which measures the lost information between the input and the reconstructed version. These networks are powerful because they learn how to represent inputs in a concise manner that contain only the most salient information required to recreate the data. After training an autoencoder to satisfactory performance, one can repurpose the encoder portion as a feature extractor in a multi-modal network because the encoder has learned to extract the important features and output of a latent representation of the input.

Variational autoencoders, introduced by Kingma et al. in 2014, differ from standard autoencoders in that they learn multivariate probability distributions rather than simple latent vectors that represent a single input [15,16]. The VAE latent representation consists of a set of distributions that each represent a latent variable of the data. For example, a VAE with a latent size of two trained on the MNIST dataset will learn two distributions, one for each distinct latent variable. Each input sample will map to a point in the latent space just like a standard autoencoder. However, the latent representations of two hand-drawn sevens will be closer to each other than the latent representations of a seven and a three. With a standard autoencoder, similar input images may have latent representations that are scattered around the latent space with no meaningful relationships between them. VAEs are useful for learning meaningful latent representations.

There are two terms in the VAE loss function that encourage this quality: the reconstruction error and the Kullback-Leibler divergence (KLD) of the latent distribution with respect to a prior distribution. The KLD measures how close the network's learned latent distributions are to the prior. Commonly, a standard multivariate normal distribution is used as the prior. When the latent distribution is similar to a prior distribution, it makes sure that the latent representations of similar inputs are close together in the latent space. Without this encouragement, the encoder could learn to "cheat and give each datapoint a representation in a different region of Euclidean space" [2]. The Kullback-Leibler divergence term in the loss function aims to avoid this behavior [19].

Standard autoencoders are simpler than VAEs and more in line with the goal to extract features from the video frames. The VAE was useful for generating new images that were similar to the real data, but generative capabilities were needless. For the autoencoder structure, a pretrained ResNet convolutional neural network was employed as the encoder portion of the autoencoder. ResNets are a family of successful computer vision networks designed to facilitate easy training of accurate image classifiers with many layers [11]. The ResNet architecture has been very successful since its debut in 2015, particularly on the ImageNet classification competition. Using a ResNet allowed the autoencoder to learn pretrained basic features of images, such as lines and edges. To construct the autoencoder, the last two layers of the ResNet architecture were removed. These two layers are used for image classification only, so they were not needed to create the representation layer.

Two rounds of hyperparameter were performed on the ResNet autoencoder, once with a ResNet50 encoder and again with a ResNet101 encoder. Table 2 shows hyperparameters for random searches on a ResNet101 autoencoder. Table 3 shows hyperparameters for random searches on a ResNet101 autoencoder.

TABLE 2

| Hyperparameter | Search Space | Best Run |
|---|---|---|
| Dropout Percentage | [0, 0.5] | 49.44% |
| Fully Connected Hidden Units | [768, . . . , 1024] | 1020 |
| Latent Size | [64, . . . , 512] | 369 |
| LR | [1^(-5), 0.01] | $9.92 \times 10^{-3}$ |
| Optimizer | {Adam, SGD, RMSprop} | RMSprop |
| LR Scheduling Factor | [0.1, 0.5] | 23.76% |

TABLE 3

| Hyperparameter | Search Space | Best Run |
|---|---|---|
| Dropout Percentage | [0, 0.5] | 42.56% |
| Epochs | {10, . . . , 30} | 26 |
| Fully Connected Hidden Units | {769, . . . , 1024} | 965 |
| Latent Size | {128, . . . , 256} | 188 |
| LR | [0.0001, 0.001] | $6.472 \times 10^{-4}$ |
| Optimizer | {Adam, SGD, RMSprop} | RMSprop |
| LR Scheduling Factor | [0.1, 0.5] | 39.48% |

Figure 8D:
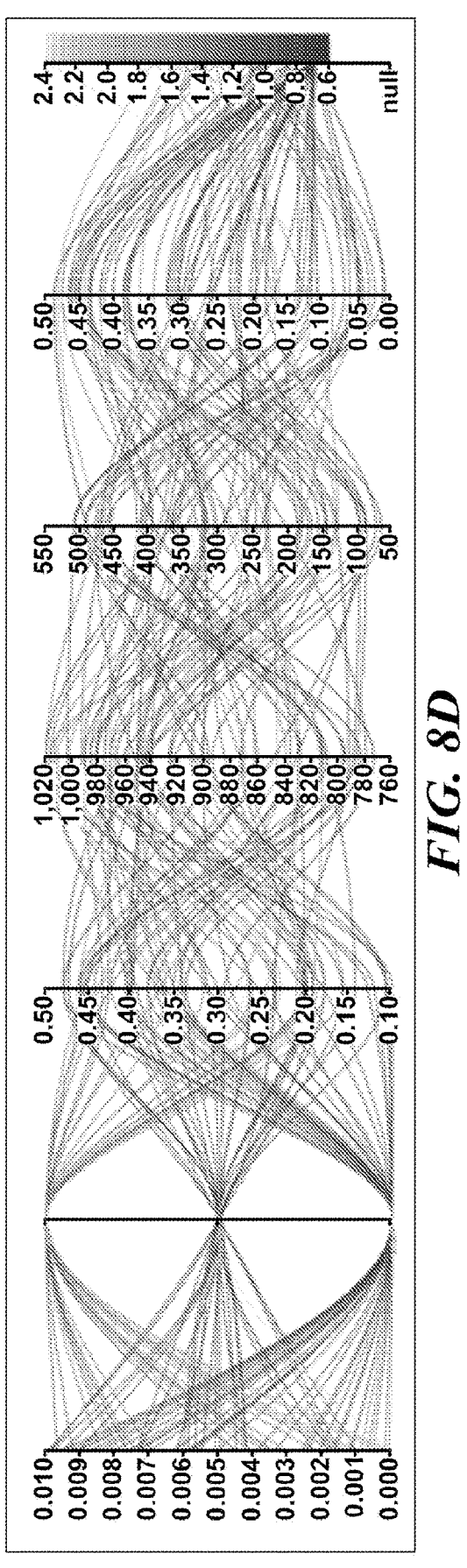
Figure 8E:
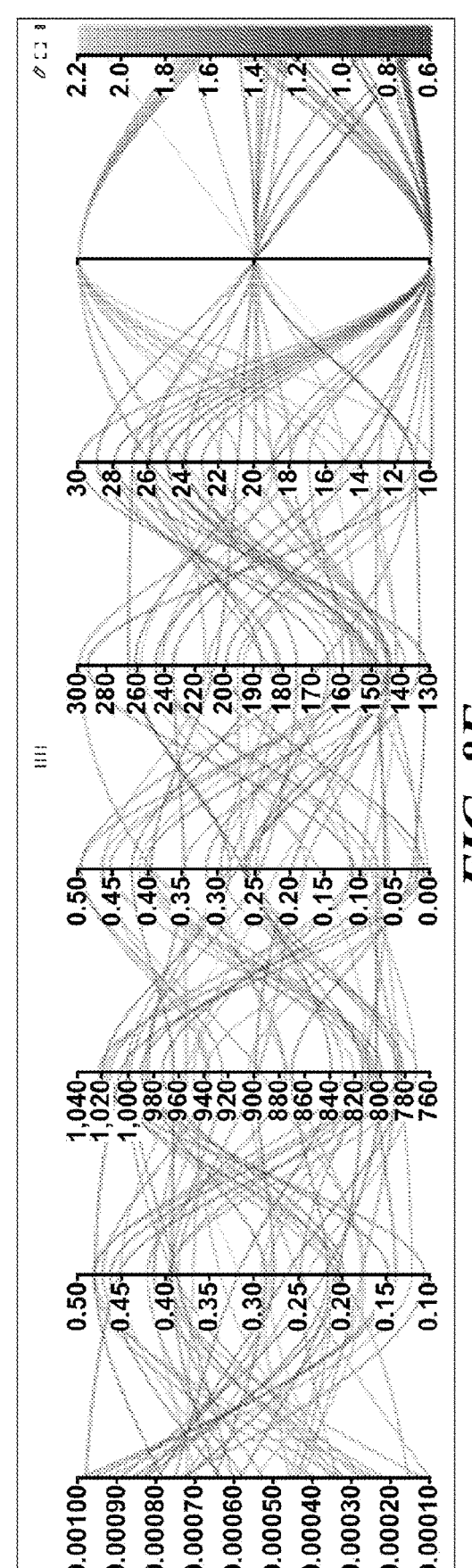

FIGS. 8D and 8E show visualizations of the two hyperparameter sweep on the ResNet50 (top) and ResNet101 (bottom) autoencoders, respectively. In the figures, each column represents the range of values for a specific parameter, and each colored line represents a training run. The color gradient represents the final reconstruction loss on the validation set (lower is better). The color of each line represents its final validation loss value.

For the variational autoencoder, during training, it was observed that KL loss would vanish (referred to as KL vanishing), and the network would default to reconstructing the same image. Posterior collapse occurs when the information from the input data loses its influence on the posterior that produces the latent variables. That is, the posterior distributions that produce latent variables given the input data can become more independent from the input. When the latent variables become disconnected from the input data, they become redundant to the decoder network, and the decoder can ignore the latent variables and leads to generic outputs, as discussed in [9]. To address posterior collapse, KL annealing schedules were attempted, as discussed in a paper by Fu et al. [7]. KL annealing is the process of applying a weight β to the KL term of the VAE loss and modifying that weight over the course of training. Cyclical annealing involves cycles of increasing β over the course of training to shift emphasis between the KL loss term and the reconstruction loss term. According to Fu et al., the cyclical annealing schedule "allows the progressive learning of more meaningful latent variables, by leveraging the informative representations of previous cycles as warm restarts" [7]. In this usage, the cyclical annealing schedule did not circumvent the posterior collapse behavior; training with this schedule still resulted in generic outputs.

Discussion

Researchers have recently made wide use of deep learning to tackle situations that involve multiple modalities of data [5, 17, 21, 23, 29, 30]. The use of deep learning with multi-modal data has allowed researchers to take advantage of the correlations between the different modalities, such as in image captioning or audiovisual speech recognition. These correlations provide more information to a model than a single modality can, often leading to useful downstream outcomes, as in the case of the Google Research paper on audiovisual speech separation [5].

There are several architectural approaches to multi-modal deep learning. In a survey by Gao et al., the researchers discuss architectures based on deep belief networks, stacked autoencoders, convolutional neural networks (CNNs), and recurrent neural networks (RNNs) [8]. Multi-modal deep neural networks typically take a multi-headed form. For example, if a network processes video and audio data, it needs two heads: one to process the raw video input and another to process the raw audio data. Once the raw data have been passed through modality-specific networks, the network can merge the resulting feature vectors into a single representation for further processing, as in [5]. This merging can be a simple concatenation of feature vectors or some more complicated aggregation of features as outlined in the tensor fusion networks described by Zadeh et al. in 2017 [32].

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

Although example embodiments of the present disclosure are explained in some instances in detail herein, it is to be understood that other embodiments are contemplated.

The following patents, applications, and publications as listed below and throughout this document are hereby incorporated by reference in their entirety herein.

[1] Achanta, R., Shaji, A., Smith, K., Lucchi, A., Fua, P., and Süsstrunk, S. (June 2010), "SLIC Superpixels", EPFL Technical Report 149300.

[2] Jaan Altosaar. "Tutorial-What is a Variational Autoencoder?" In: (August 2016). doi: 10.5281/zenodo.4462916.

17

[3] Davide Anguita, Alessandro Ghio, Luca Oneto, Xavier Parra, Jorge Luis Reyes-Ortiz, et al. A public domain dataset for human activity recognition using smartphones. In Esann, volume 3, page 3, 2013.

[4] Bewley, A., Ge, Z., Ott, L., Ramos, F., Upcroft, B. (2016). Simple online and real-time tracking. 2016 IEEE International Conference on Image Processing (ICIP), 3464-3468.

[5] Ariel Ephrat et al. "Looking to Listen at the Cocktail Party: A Speaker-Independent Audio-Visual Model for Speech Separation". In: ACM Transactions on Graphics 37.4 (Aug. 10, 2018), pp. 1-11. issn: 0730-0301, 1557-7368. doi: 10.1145/3197517.3201357. arXiv:1804.03619. url: http://arxiv.org/abs/1804.03619 (visited on May 4, 2021).

[6] Hassan Fawaz et al. "Deep Learning for Time Series Classification: A Review". In Data Mining and Knowledge Discovery 33 (March 2019), pp. 917-963. doi: 10.1007/s10618-019-00619-1.

[7] Hao Fu et al. Cyclical Annealing Schedule: A Simple Approach to Mitigating KL Vanishing. 2019. arXiv: 1903.10145 [cs.LG].

[8] Jing Gao et al. "A Survey on Deep Learning for Multimodal Data Fusion". In: Neural Computation 32.5 (May 2020), pp. 829-864. issn: 0899-7667, 1530-888X. doi: 10.1162/neco_a_01273. url: https://www.mit-pressjournals.org/doi/abs/10.1162/neco_a_01273 (visited on Jan. 7, 2021).

[9] Anirudh Goyal et al. Z-Forcing: Training Stochastic Recurrent Networks. 2017. arXiv: 1711.05411 [stat.ML].

[10] Alex Graves and Jürgen Schmidhuber. Framewise phoneme classification with bidirectional LSTM networks. In Proceedings. 2005 IEEE International Joint Conference on Neural Networks, 2005., volume 4, pages 2047-2052. IEEE, 2005.

[11] Kaiming He et al. Deep Residual Learning for Image Recognition. 2015. arXiv: 1512.03385 [cs.CV].

[12] He, K., Zhang, X., Ren, S., Sun, J. (2016). Deep residual learning for image recognition. 2016 IEEE Conference on Computer Vision and Pattern Recognition (CVPR), 770-778.

[13] Seongwoon Jeong, Max Ferguson, and Kincho Law, "Sensor data reconstruction and anomaly detection using bidirectional recurrent neural network," Page 25, 03 2019.

[14] Karthik, S., Prabhu, A., Gandhi, V. (2020), "Simple Unsupervised Multi-Object Tracking," Computing Research Repository (CoRR).

[15] Diederik P Kingma and Max Welling. Auto-Encoding Variational Bayes. 2014. arXiv: 1312.6114 [stat.ML].

[16] Diederik P. Kingma and Max Welling. "An Introduction to Variational Autoencoders," In: Foundations and Trends® in Machine Learning 12.4 (2019), pp. 307-392. issn: 1935-8245. doi: 10.1561/2200000056. url: http://dx.doi.org/10.1561/2200000056.

[17] J. Kumar et al. "On-the-fly hand detection training with application in egocentric action recognition," In 2015 IEEE Conference on Computer Vision and Pattern Recognition Workshops (CVPRW). 2015 IEEE Conference on Computer Vision and Pattern Recognition Workshops (CVPRW). ISSN: 2160-7516. June 2015, pp. 18-27. doi: 10.1109/CVPRW.2015. 7301344.

[18] Li, B., Sun, Z., Guo, Y. (2019). SuperVAE: Superpixelwise Variational autoencoder for salient object detection. Proceedings of the AAAI Conference on Artificial Intelligence, 33, 8569-8576.

[19] Vincent Lunot. "On the use of the Kullback-Leibler divergence in Variational Autoencoders," In: (Apr. 26, 2019). url: https://www.vincent-lunot.com/post/on-the-use-of-the-kullback-leibler-divergence-in-variational-autoencoders/.

[20] Luo, W., Xing, J., Milan, A., Zhang, X., Liu, W., Kim, T. (2021). "Multiple object tracking: A literature review." Artificial Intelligence, 293.

[21] Jiquan Ngiam et al., "Multimodal Deep Learning," In: ( ) p. 8.

[22] Ning, G., Zhang, Z., Huang, C., Ren, X., Wang, H., Cai, C., He, Z. (2017), "Spatially Supervised Recurrent Convolutional Neural Networks for Visual Object Tracking," 2017 IEEE International Symposium on Circuits and Systems (ISCAS), 1-4.

[23] Francisco Javier Ordonez and Daniel Roggen. "Deep Convolutional and LSTM Recurrent Neural Networks for Multimodal Wearable Activity Recognition," In Sensors 16.1 (January 2016). Number: 1 Publisher: Multidisciplinary Digital Publishing Institute, p. 115. doi: 10.3390/s16010115. url: https://www.mdpi.com/1424-8220/16/1/115 (visited on Jan. 14, 2021).

[24] Pirsiavash, H., Ramanan, D., Fowlkes, C. C. (2011), "Globally-optimal greedy algorithms for tracking a variable number of objects," 2011 IEEE Conference on Computer Vision and Pattern Recognition (CVPR), 1201-1208.

[25] Mangal Prakash, Alexander Krull, and Florian Jug, "DivNoising: Diversity Denoising with Fully Convolutional Variational Autoencoders," In: arXiv:2006.06072 [cs, eess] (Jun. 10, 2020). arXiv:2006.06072. url: http://arxiv.org/abs/2006.06072 (visited on Feb. 17, 2021).

[26] Savitzky, A., Golay, M. J. (1964). Smoothing and differentiation of data by simplified least squares procedures. Analytical Chemistry, 36 (8), 1627-1639.

[27] Alex Sherstinsky. "Fundamentals of Recurrent Neural Network (RNN) and Long Short-Term Memory (LSTM) Network." In Elsevier 404 (March 2020). url: https://arxiv.org/pdf/1808.03314.pdf)

[28] Wensi Tang, Guodong Long, Lu Liu, Tianyi Zhou, Jing Jiang, and Michael Blumenstein. Rethinking 1d-cnn for time series classification: A stronger baseline. arXiv preprint arXiv:2002.10061, 2020.

[29] Eric Tatulli and Thomas Hueber. "Feature extraction using multi-modal convolutional neural networks for visual speech recognition," In: Mar. 5, 2017. doi: 10.1109/ICASSP.2017.7952701.

[30] Xitong Yang et al. "Deep Multi-modal Representation Learning from Temporal Data," In: arXiv:1704.03152 [cs] (Apr. 11, 2017). arXiv:1704. 03152. url: http://arxiv.org/abs/1704.03152 (visited on Jan. 6, 2021).

[31] Yao, R., Lin, G., Xia, S., Zhao, J., Zhou, Y. (2020). "Video object segmentation and tracking." ACM Transactions on Intelligent Systems and Technology, 11 (4), 1-47.

[32] Amir Zadeh et al. "Tensor Fusion Network for Multimodal Sentiment Analysis," In: Proceedings of the 2017 Conference on Empirical Methods in Natural Language Processing. Copenhagen, Denmark: Association for Computational Linguistics, September 2017, pp. 1103-1114. doi: 10.18653/v1/D17-1115. url: https://www.aclweb.org/anthology/D17-1115.

[33] Martinez, D., Brewer, W., Stretzoff, A., and Daniel, W., "Rotorcraft Virtual Sensors Via Deep Regression," Journal of Parallel and Distributed Computing, Vol. 135, 2020.

[34] Figueroa, F. and Schmalzel, J., "Rocket Testing and Integrated System Health Management," NASA Technical Report, Vol. SSTI-2200-0061, 2005.

[35] Mahajan, A., Chitikeshi, S., Utterback, L., Bandhill, P., and Figueroa, F., "Application of Intelligent Sensors in the Integrated Systems Health Monitoring of a Rocket Test Stand," Defense and Security Symposium, Orlando, FL, 2006.

[36] Schmalzel, J., Bracey, A., Rawls, S., Morris, J., Turowski, M., Franzl, R., and Figueroa, F., "Smart Sensor Demonstration Payload," IEEE Instrumentation and Measurement Magazine, November 2010.

[37] D. Noble, L. Angello, S. Shepard, J. Kee, B. Emerson, T. Lieuwen, "Investigation into Advanced Combustion System Health Monitoring," ASME Turbo Expo, June 2019.

[38] A. Petrarolo, M. Kobald, A. Rüttger, "Data Clustering of Hybrid Rocket Combustion Flame", AIAA Propulsion and Energy, August 2019.

[39] Angelos Katharopoulos and Fran cois Fleuret, "Not all samples are created equal: Deep learning with importance sampling," CoRR,abs/1803.00942, 2018.

[40] Bob Kurbel. Peak of Flight Newsletter, volume 441. April 2017.

[41] Kushagra Rastogi and Navreet Saini, "Virtual sensor modelling using neural networks with coefficient-based adaptive weights and biases search algorithm for diesel engines," CoRR, abs/1712.08319, 2017.

[42] Shan-Bin Sun, Yuan-Yuan He, Si-Da Zhou, and Zhen-Jiang Yue, "Adata-driven response virtual sensor technique with partial vibration measurements using convolutional neural network," Sensors, 17:2888, 12 2017.

[43] Zhou Wang, Alan C. Bovik, Hamid R. Sheikh, and Eero P. Simoncelli, "Image quality assessment: From error visibility to structural similarity," IEEE TRANSACTIONS ON IMAGE PROCESSING, 13 (4): 600-612, 2004.

[44] Jinsung Yoon, William R. Zame, and Mihaela van der Schaar. "Deep sensing: Active sensing using multi-directional recurrent neural networks," In International Conference on Learning Representations, 2018.

What is claimed is:

1. A virtual sensing deep neural network comprising:
a deep neural network trained with a plurality of sensor data and plume image data measured from a plurality of sensors and a camera sensor of a test cell housing an engine,
wherein the deep neural network is configured to generate virtual plume image data from a second plurality of sensor data of a jet engine or rocket motor, wherein the virtual plume image data is analyzed to determine a presence and localization of shock wave data in the virtual plume image data, and wherein the presence and localization of shock wave data in the virtual plume image data are used to determine a virtual sensed Mach number or an internal pressure of the jet engine or rocket motor, wherein the generated virtual plume image data is employed in the control or monitoring of the jet engine or rocket motor.

2. The virtual sensing deep neural network of claim 1 comprising:
a second deep neural network trained with a plurality of sensor data measured from a plurality of sensors of a test cell housing an engine,
wherein the second deep neural network is configured to generate a temperature, pressure, thrust, or acceleration sensor data from a second plurality of sensor data of a jet engine or rocket motor, wherein the generated temperature, pressure, thrust, or acceleration sensor data is employed in the control or monitoring of the jet engine or rocket motor.

3. The virtual sensing deep neural network of claim 2, wherein the second plurality of sensor data comprises (i) surface temperature data of the jet engine or rocket motor and/or (ii) acoustic data of the jet engine or rocket motor.

4. The virtual sensing deep neural network of claim 2, wherein the second plurality of sensor data further comprises (i) thrust data of the jet engine or rocket motor, (ii) acceleration data of the jet engine or rocket motor, (iii) pressure data of the jet engine or rocket motor, and/or (iv) flow rate data of fuel of the jet engine or rocket motor.

5. The virtual sensing deep neural network of claim 2, wherein the deep neural network comprises an autoencoder, a RNN, a LSTM-based deep neural network, a CNN-based deep neural network, or a combination thereof.

6. The virtual sensing deep neural network of claim 1 further comprising:
a second deep neural network trained with the plurality of sensor data and plume image data measured from the plurality of sensors and the camera sensor of the test cell housing the engine,
wherein the second deep neural network is configured to generate a virtual sensed temperature data from the second plurality of sensor data of the jet engine or rocket motor.

7. The virtual sensing deep neural network of claim 6, wherein the second plurality of sensor data comprises:
surface temperature data of the jet engine or rocket motor, thrust data of the jet engine or rocket motor, acceleration data of the jet engine or rocket motor, acoustic data of the jet engine or rocket motor, pressure data of the jet engine or rocket motor, and/or flow rate data of fuel of the jet engine or rocket motor.

8. The virtual sensing deep neural network of claim 1, wherein the deep neural network is configured to output, via a report, the determined virtual sensed Mach number or internal pressure of the jet engine or rocket motor.

9. The virtual sensing deep neural network of claim 8, wherein the output of the determined virtual sensed Mach number or internal pressure of the jet engine or rocket motor is used, via predictive maintenance analysis, to estimate a remaining life of the jet engine or rocket motor or an estimated failure of the jet engine or rocket motor.

10. The virtual sensing deep neural network of claim 1, further comprising instructions that, when executed by a processor, causes the processor to determine the presence and localization of shock wave data in the virtual plume image data by:
generating a set of superpixel groups in the virtual plume image data, wherein each of the set of superpixel groups comprises (i) a plurality of pixels and (ii) a mean or central pixel location of the plurality of pixels; and
selecting, via a clustering analysis or relative peak analysis, of the virtual plume image data, one or more set of superpixel groups.

11. The virtual sensing deep neural network of claim 1, wherein the second plurality of sensor data comprises:
surface temperature data of the jet engine or rocket motor;
thrust data of the jet engine or rocket motor; and/or acceleration data of the jet engine or rocket motor
acoustic data of the jet engine or rocket motor;
pressure data of the jet engine or rocket motor; and/or flow rate data of fuel of the jet engine or rocket motor.

12. The virtual sensing deep neural network of claim 1, wherein the second plurality of sensor data further comprises:

acoustic data of the jet engine or rocket motor;

pressure data of the jet engine or rocket motor; and/or flow rate data of fuel of the jet engine or rocket motor.

13. The virtual sensing deep neural network of claim 1, wherein the deep neural network comprises an autoencoder, an RNN, an LSTM-based deep neural network, a CNN-based deep neural network, or a combination thereof.

14. The virtual sensing deep neural network of claim 1, wherein the deep neural network is configured to output the determined virtual sensed Mach number or internal pressure of the jet engine or rocket motor for anomaly detection.

15. The virtual sensing deep neural network of claim 1 further comprising:

a second deep neural network trained with the plurality of sensor data and plume image data measured from the plurality of sensors and the camera sensor of the test cell housing the engine, wherein the second deep neural network is configured to generate a virtual sensed pressure data from the second plurality of sensor data of the jet engine or rocket motor.

16. The virtual sensing deep neural network of claim 1 further comprising:

a second deep neural network trained with the plurality of sensor data and plume image data measured from the plurality of sensors and the camera sensor of the test cell housing the engine, wherein the second deep neural network is configured to generate a virtual sensed thrust data from the second plurality of sensor data of the jet engine or rocket motor.

17. The virtual sensing deep neural network of claim 1 further comprising:

a second deep neural network trained with the plurality of sensor data and plume image data measured from the plurality of sensors and the camera sensor of the test cell housing the engine, wherein the second deep neural network is configured to generate a virtual sensed acceleration data from the second plurality of sensor data of the jet engine or rocket motor.

18. A method of training a virtual sensing deep neural network, the method comprising:

providing a deep neural network trained with a plurality of sensor data and plume image data measured from a plurality of sensors and a camera sensor of a test cell housing an engine, generating, using the trained deep neural network, virtual plume image data from a second plurality of sensor data of a jet engine or rocket motor, wherein the generated virtual plume image data is analyzed to determine a presence and localization of shock wave data in the virtual plume image data;

determining a virtual sensed Mach number or an internal pressure of the jet engine or rocket motor based on the presence and localization of shock wave data in the virtual plume image data; and outputting, via a report or to a controller, the virtual sensed Mach number or an internal pressure of the jet engine or rocket motor, wherein the generated virtual sensed Mach number or an internal pressure is employed in the control or monitoring of the jet engine or rocket motor.

* * * * *